United States Patent
Jakobsson

(10) Patent No.: US 10,277,628 B1
(45) Date of Patent: *Apr. 30, 2019

(54) DETECTING PHISHING ATTEMPTS

(71) Applicant: ZapFraud, Inc., Portola Valley, CA (US)

(72) Inventor: Bjorn Markus Jakobsson, Portola Valley, CA (US)

(73) Assignee: ZAPFRAUD, INC., Portola Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/487,989

(22) Filed: Sep. 16, 2014

Related U.S. Application Data

(60) Provisional application No. 61/878,229, filed on Sep. 16, 2013.

(51) Int. Cl.
*H04L 29/06* (2006.01)

(52) U.S. Cl.
CPC .................. *H04L 63/1483* (2013.01)

(58) Field of Classification Search
None
See application file for complete search history.

(56) References Cited

U.S. PATENT DOCUMENTS

| | | | |
|---|---|---|---|
| 6,161,130 A | 12/2000 | Horvitz | |
| 6,574,658 B1 | 6/2003 | Gabber | |
| 6,721,784 B1 | 4/2004 | Leonard | |
| 7,293,063 B1 | 11/2007 | Sobel | |
| 7,299,261 B1 | 11/2007 | Oliver | |
| 7,644,274 B1 | 1/2010 | Jakobsson | |
| 7,809,795 B1 | 10/2010 | Cooley | |
| 7,814,545 B2 * | 10/2010 | Oliver | H04L 51/12 726/22 |
| 7,873,996 B1 | 1/2011 | Emigh | |
| 7,899,213 B2 | 3/2011 | Otsuka | |
| 7,899,866 B1 | 3/2011 | Buckingham | |
| 7,917,655 B1 | 3/2011 | Coomer | |
| 7,921,063 B1 | 4/2011 | Quinlan | |
| 8,010,614 B1 | 8/2011 | Musat | |
| 8,079,087 B1 * | 12/2011 | Spies | G06F 21/51 726/26 |
| 8,131,655 B1 | 3/2012 | Cosoi | |

(Continued)

OTHER PUBLICATIONS

A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.

(Continued)

*Primary Examiner* — Trang T Doan
(74) *Attorney, Agent, or Firm* — Schwabe Williamson & Wyatt, PC

(57) ABSTRACT

Classifying electronic communications is disclosed. An electronic communication is received. A first likelihood that a potential recipient of the electronic communication would conclude that the communication was transmitted on behalf of an authoritative entity is determined. An assessment of a second likelihood that the received communication was transmitted with authorization from the purported authoritative entity is performed. The electronic communication is classified based at least in part on the first and second liklihoods.

15 Claims, 26 Drawing Sheets

(56) References Cited

U.S. PATENT DOCUMENTS

| | | | |
|---|---|---|---|
| 8,255,572 B1 * | 8/2012 | Coomer | G06Q 10/107 |
| | | | 709/206 |
| 8,489,689 B1 | 7/2013 | Sharma | |
| 8,527,436 B2 * | 9/2013 | Salaka | G06Q 10/107 |
| | | | 706/13 |
| 8,566,938 B1 | 10/2013 | Prakash | |
| 8,667,069 B1 | 3/2014 | Connelly | |
| 8,719,940 B1 | 5/2014 | Higbee | |
| 8,752,172 B1 | 6/2014 | Dotan | |
| 8,832,202 B2 | 9/2014 | Yoshioka | |
| 8,918,466 B2 | 12/2014 | Yu | |
| 8,984,640 B1 | 3/2015 | Emigh | |
| 9,031,877 B1 * | 5/2015 | Santhana | G06Q 20/4016 |
| | | | 705/50 |
| 9,060,057 B1 | 6/2015 | Danis | |
| 9,245,115 B1 | 1/2016 | Jakobsson | |
| 9,277,049 B1 | 3/2016 | Danis | |
| 9,338,287 B1 | 5/2016 | Russo | |
| 9,471,714 B2 | 10/2016 | Iwasaki | |
| 9,473,437 B1 | 10/2016 | Jakobsson | |
| 9,760,644 B2 * | 9/2017 | Khvostichenko | G06Q 10/00 |
| 2002/0138271 A1 | 9/2002 | Shaw | |
| 2003/0023736 A1 | 1/2003 | Abkemeier | |
| 2003/0229672 A1 | 12/2003 | Kohn | |
| 2003/0236845 A1 | 12/2003 | Pitsos | |
| 2004/0176072 A1 | 9/2004 | Gellens | |
| 2004/0177120 A1 | 9/2004 | Kirsch | |
| 2004/0203589 A1 | 10/2004 | Wang | |
| 2005/0033810 A1 | 2/2005 | Malcolm | |
| 2005/0060643 A1 | 3/2005 | Glass | |
| 2005/0076084 A1 | 4/2005 | Loughmiller | |
| 2005/0080855 A1 | 4/2005 | Murray | |
| 2005/0080857 A1 | 4/2005 | Kirsch | |
| 2005/0182735 A1 | 8/2005 | Zager | |
| 2005/0188023 A1 | 8/2005 | Doan | |
| 2005/0216587 A1 | 9/2005 | John | |
| 2005/0223076 A1 | 10/2005 | Barrus | |
| 2005/0235065 A1 | 10/2005 | Le | |
| 2005/0257261 A1 | 11/2005 | Shraim | |
| 2006/0004772 A1 | 1/2006 | Hagan | |
| 2006/0015563 A1 * | 1/2006 | Judge | G06Q 10/107 |
| | | | 709/206 |
| 2006/0026242 A1 | 2/2006 | Kuhlmann | |
| 2006/0031306 A1 | 2/2006 | Haverkos | |
| 2006/0053490 A1 | 3/2006 | Herz | |
| 2006/0149821 A1 | 7/2006 | Rajan | |
| 2006/0168329 A1 | 7/2006 | Tan | |
| 2006/0195542 A1 | 8/2006 | Nandhra | |
| 2006/0206713 A1 | 9/2006 | Hickman | |
| 2006/0224677 A1 | 10/2006 | Ishikawa | |
| 2006/0253597 A1 | 11/2006 | Mujica | |
| 2006/0259558 A1 | 11/2006 | Yen | |
| 2006/0265498 A1 | 11/2006 | Turgeman | |
| 2007/0019235 A1 | 1/2007 | Lee | |
| 2007/0027992 A1 | 2/2007 | Judge | |
| 2007/0101423 A1 | 5/2007 | Oliver | |
| 2007/0107053 A1 * | 5/2007 | Shraim | G06Q 10/107 |
| | | | 726/22 |
| 2007/0130618 A1 | 6/2007 | Chen | |
| 2007/0143432 A1 | 6/2007 | Klos | |
| 2007/0192169 A1 | 8/2007 | Herbrich | |
| 2007/0198642 A1 | 8/2007 | Malik | |
| 2007/0239639 A1 | 10/2007 | Loughmiller | |
| 2007/0271343 A1 | 11/2007 | George | |
| 2007/0299915 A1 * | 12/2007 | Shraim | G06Q 10/107 |
| | | | 709/206 |
| 2007/0299916 A1 | 12/2007 | Bates | |
| 2008/0004049 A1 | 1/2008 | Yigang | |
| 2008/0046970 A1 | 2/2008 | Oliver | |
| 2008/0050014 A1 | 2/2008 | Bradski | |
| 2008/0104235 A1 * | 5/2008 | Oliver | H04L 29/12066 |
| | | | 709/224 |
| 2008/0141374 A1 | 6/2008 | Sidiroglou | |
| 2008/0175266 A1 | 7/2008 | Alperovitch | |
| 2008/0178288 A1 * | 7/2008 | Alperovitch | G06Q 10/107 |
| | | | 726/22 |
| 2008/0235794 A1 * | 9/2008 | Bogner | G06F 21/554 |
| | | | 726/22 |
| 2008/0276315 A1 | 11/2008 | Shuster | |
| 2008/0290154 A1 | 11/2008 | Barnhardt | |
| 2009/0064330 A1 * | 3/2009 | Shraim | H04L 51/12 |
| | | | 726/22 |
| 2009/0077617 A1 | 3/2009 | Levow | |
| 2009/0089859 A1 * | 4/2009 | Cook | H04L 51/12 |
| | | | 726/3 |
| 2009/0210708 A1 | 8/2009 | Chou | |
| 2009/0228583 A1 | 9/2009 | Pocklington | |
| 2009/0252159 A1 | 10/2009 | Lawson | |
| 2009/0292781 A1 * | 11/2009 | Teng | G06Q 10/107 |
| | | | 709/206 |
| 2009/0319629 A1 * | 12/2009 | de Guerre | G06Q 10/107 |
| | | | 709/206 |
| 2010/0030798 A1 | 2/2010 | Kumar | |
| 2010/0043071 A1 * | 2/2010 | Wang | G06F 21/51 |
| | | | 726/22 |
| 2010/0070761 A1 * | 3/2010 | Gustave | H04L 9/3247 |
| | | | 713/156 |
| 2010/0115040 A1 | 5/2010 | Sargent | |
| 2010/0145900 A1 * | 6/2010 | Zheng | G06N 7/005 |
| | | | 706/52 |
| 2010/0287246 A1 | 11/2010 | Klos | |
| 2010/0299399 A1 | 11/2010 | Wanser | |
| 2010/0313253 A1 | 12/2010 | Reiss | |
| 2011/0087485 A1 | 4/2011 | Maude | |
| 2011/0191847 A1 | 8/2011 | Davis | |
| 2011/0271349 A1 | 11/2011 | Kaplan | |
| 2012/0030293 A1 * | 2/2012 | Bobotek | G06Q 10/10 |
| | | | 709/206 |
| 2012/0124664 A1 | 5/2012 | Stein | |
| 2012/0167233 A1 | 6/2012 | Gillum | |
| 2012/0227104 A1 | 9/2012 | Sinha | |
| 2012/0246725 A1 * | 9/2012 | Osipkov | G06F 21/572 |
| | | | 726/23 |
| 2012/0278694 A1 * | 11/2012 | Washio | G06F 17/2288 |
| | | | 715/205 |
| 2013/0067012 A1 | 3/2013 | Matzkel | |
| 2013/0081142 A1 | 3/2013 | McDougal | |
| 2013/0083129 A1 | 4/2013 | Thompson | |
| 2013/0128883 A1 | 5/2013 | Lawson | |
| 2013/0217365 A1 * | 8/2013 | Ramnani | H04L 67/306 |
| | | | 455/414.1 |
| 2013/0333028 A1 * | 12/2013 | Hagar | H04L 63/0236 |
| | | | 726/22 |
| 2013/0346528 A1 | 12/2013 | Shinde | |
| 2014/0123279 A1 * | 5/2014 | Bishop | H04L 63/1491 |
| | | | 726/23 |
| 2014/0230061 A1 * | 8/2014 | Higbee | H04L 63/1416 |
| | | | 726/24 |
| 2014/0250506 A1 | 9/2014 | Hallam-Baker | |
| 2015/0030156 A1 | 1/2015 | Perez | |
| 2015/0067833 A1 * | 3/2015 | Verma | H04L 63/1483 |
| | | | 726/22 |
| 2015/0081722 A1 | 3/2015 | Terada | |
| 2016/0104132 A1 | 4/2016 | Abbatiello | |
| 2017/0091274 A1 | 3/2017 | Guo | |

OTHER PUBLICATIONS

Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

Author Unknown, "Babastik: AntiSpam Personal", downloaded from "https://web.archive.org/web/20101031061734/babastik.com/AntiSpam-Personal/", Oct. 31, 2010.

(56) References Cited

OTHER PUBLICATIONS

Author Unknown, "bluebottle—trusted delivery", downloaded from "https://web.archive.org/web/20140715223712/https://bluebottle.com/trusted-delivery.php", Jul. 15, 2014.
Author Unknown, "Federal Court Denies Attempt by Mailblocks, Inc. To Shut Down Spamarrest LLC", downloaded from "http://www.spamarrest.com/pr/releases/20030611.jsp", Seattle, WA, Jun. 11, 2003.
Author Unknown, "First of all, Your Software Is Excellent", downloaded from "https://web.archive.org/web/20120182074130/http://www.spamresearchcenter.com", Aug. 12, 2012.
Author Unknown, "Frequently asked questions regarding Spamboomerang: Test Drive how Spam Boomerang treats unknown senders", downloaded from "https://web.archive.org/web/20080719034305/http:/www.triveni.com.au/Spamboomerang/Spam_Faq.html", Jul. 19, 2008.
Author Unknown, "Junk Mail Buffering Agent", downloaded from http://www.ivarch.com/programs/jmba.shtml, Jun. 2005.
Author Unknown, "No Software to Install", downloaded from "https://web.archive.org/web/201002095356/http://www.cleanmymailbox.com:80/howitworks.html", Oct. 2, 2010.
Author Unknown, "Rejecting spam with a procmail accept list", downloaded from "https://web.archive.org/web/20160320083258/http:/angel.net/~nic/spam-x/", Mar. 20, 2016.
Author Unknown, "SpamFry: Welcome to our Beta testers", downloaded from https://web.archive.org/web/20050404214637/http:www.spamfry.net:80/, Apr. 4, 2005.
Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.
Author Unknown, "Stop Spam Mail, Block Offensive Materials, Save Time and Money", iPermitMail Email Firewall Version 3.0, 2003.
Author Unknown, (Steven)—Artificial Intelligence for your email, downloaded from "https://web.archive.org/web/20140607193205/http://www.softwaredevelopment.net.au:80/pge_steven.htm", Jun. 7, 2014.
Author Unknown, 0Spam.com, Frequently Asked Questions, downloaded from "https://web.archive.org/web/20150428181716/http://www.0spam.com:80/support.shtml#whatisit", Apr. 28, 2015.
Author Unknown, Affini: A Network of Trust, downloaded from https://web.archive.org/web/20100212113200/http://www.affini.com:80/main/info.html, Feb. 12, 2010.
Author Unknown, Alan Clifford's Software Page, downloaded from "https://web.archive.org/web/20150813112933/http:/clifford.ac/software.html", Aug. 13, 2015.
Author Unknown, ASB AntiSpam official home page, downloaded from "https://web.archive.org/web/20080605074520/http://asbsoft.netwu.com:80/index.html", Jun. 5, 2008.
Author Unknown, Boxbe, Wikipedia, Nov. 17, 2016, https://en.wikipedia.org/wiki/Boxbe?wprov=sfsi1.
Author Unknown, BoxSentry, An advanced email validation facility to prevent Spam, downloaded from "https://web.archive.org/web/20040803060108/http://www.boxsentry.com:80/workings.html", Aug. 3, 2004.
Author Unknown, CaAPTCHA: Telling Humans and Computers Apart Automatically, downloaded from "https://web.archive.org/web/20160124075223/http:/www.captcha.net/", Jan. 24, 2016.
Author Unknown, CashRamSpam.com, "Learn More about CRS: Welcome to CashRamSpam", downloaded from "https://web.archive.org/web/20151014175603/http:/cashramspam.com/learnmore/index.phtml", Oct. 14, 2015.
Author Unknown, drcc nsj, New Features: Query/Response system and Bayesian auto-leaning, downloaded from "https://web.archive.org/web/20150520052601/http:/domino-240.drcc.com:80/publicaccess/news.nsf/preview/DCRR-69PKU5", May 20, 2015.
Author Unknown, FairUCE: A spam filter that stops spam by verifying sender identity instead of filtering content., downloaded from "https://web.archive.org/web/20061017101305/https:/secure.alphaworks.ibm.com/tech/fairuce", posted Nov. 30, 2004, captured on Oct. 17, 2006.
Author Unknown, Home Page for "Countering Spam with Ham-Authenticated Email and the Guarded Email Protocol", downloaded from https://web.archive.org/web/20150913075130/http:/www.dwheeler.com/guarded-email/, Sep. 13, 2015.
Author Unknown, Home: About.com, downloaded from "https://web.archive.org/web/20110201205543/quarantinemail.com/" Feb. 1, 2011.
Author Unknown, How ChoiceMail Works, downloaded from "https://web.archive.org/web/20160111013759/http://www.digiportal.com:80/productslhow-choicemail-works.html", Jan. 11, 2016.
Author Unknown, How Mail Unknown works., downloaded from "https://web.archive.org/web/20100123200126/http://www.mailunknown.com:80/HowMailUnknownWorks.asp#VerifyValidate", Jan. 23, 2010.
Author Unknown, Joe Maimon—Sendmail Page, downloaded from "https://web.archive.org/web/20150820074626/http:/www.jmaimon.com/sendmail/" Aug. 20, 2015.
Author Unknown, Kens Spam Filter 1.40, downloaded from "https://web.archive.org/web/20080317184558/http://www.kensmail.net:80/spam.html", Mar. 17, 2008.
Author Unknown, mailcircuit.com, Secure: Spam Protection, downloaded from "https://web.archive.org/web/20131109042243/http:/www.mailcircuit.com/secure/", Nov. 9, 2013.
Author Unknown, mailDuster, Tour 1: Show me how mailDuster blocks spam, downloaded from "https://web.archive.org/web/20070609210003/http://www.mailduster.com:80/tour1.phtml", Jun. 9, 2007.
Author Unknown, mailDuster, Tour 2: But how do my friends and colleagues send me email?, downloaded from "https://web.archive.org/web/20070609210039/http://www.mailduster.com:80/tour2.phtml", Jun. 9, 2007.
Author Unknown, mailDuster, Tour 3: How do I manage this "Allow and Deny List"?, downloaded from "https://web.archive.org/web/20070610012141/http://www.mailduster.com:80/tour3.phtml", Jun. 10, 2007.
Author Unknown, mailDuster, User Guide, downloaded from "https://web.archive.org/web/20070612091602/http://www.mailduster.com:80/userguide.phtml", Jun. 12, 2007.
Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.
Author Unknown, PermitMail, Products: The most advanced email firewall available for your business, downloaded from "https://web.archive.org/web/20160219151855/http://ipermitmail.com/products/", Feb. 19, 2016.
Author Unknown, Petmail Design, downloaded from "https://web.archive.org/web/20150905235136if_/http:/petmail.lothar.com/design.html", Jul. 2005.
Author Unknown, PostShield.net, Challenge And Response, downloaded from "https://web.archive.org/web/20080117111334/http://www.postshield.net:80/ChallengeAndResponse.aspx", Jan. 17, 2008.
Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, qconfirm—How it works, downloaded from https://web.archive.org/web/20150915060329/http:/smarden.org/qconfirm/technical.html, Sep. 15, 2015.
Author Unknown, Say Goodbye to Email Overload, downloaded from "https://web.archive.org/web/20160119092844/http://www.boxbe.com:80/how-it-works", Jan. 19, 2016.

(56) References Cited

OTHER PUBLICATIONS

Author Unknown, sendio, "Inbox Security. Threats eliminated with a layered technology approach.", downloaded from "https://web.archive.org/web/20140213192151/http:/www.sendio.com/solutions/security/", Feb. 13, 2014.
Author Unknown, Spam Pepper, Combatting Net Spam, downloaded from "https://web.archive.org/web/20141002210345/http://www.spampepper.com:80/spampepper-com/", Oct. 2, 2014.
Author Unknown, Spam Snag, Stop Unsolicited Emails forever!, downloaded from "https://web.archive.org/web/20081220202500/http://www.spamsnag.com:80/how.php", Dec. 20, 2008.
Author Unknown, Spam: Overview, downloaded from "https://web.archive.org/web/20090107024207/http:/www.spamwall.net/products.htm", Jan. 7, 2009.
Author Unknown, SpamBlocks is a Web based Mail filtering service which integrates with your existing mailbox., downloaded from "https://web.archive.org/web/20090107050428/http:/www.spamblocks.net/howitworks/detailed_system_overview.php", Jan. 7, 2009.
Author Unknown, SpamCerbere.com, downloaded from "https://web.archive.org/web/20070629011221/http:/www.spamcerbere.com:80/en/howitworks.php", Jun. 29, 2007.
Author Unknown, Spamjadoo: Ultimate Spam Protection, downloaded from "https://web.archive.org/web/20140512000636/http:/www.spamjadoo.com:80/esp-explained.htm" May 12, 2014.
Author Unknown, SpamKilling, "What is AntiSpam?", downloaded from "https://web.archive.org/web/20100411141933/http:/www.spamkilling.com:80/home_html.htm", Apr. 11, 2010.
Author Unknown, SpamRestraint.com: How does it work?, downloaded from "https://web.archive.org/web/20050206071926/http://www.spamrestraint.com:80/moreinfo.html", Feb. 6, 2005.
Author Unknown, Tagged Message Delivery Agent (TMDA), downloaded from "http://web.archive.org/web/20160122072207/http://www.tmda.net/", Jan. 22, 2016.
Author Unknown, UseBestMail provides a mechanism for validating mail from non-UseBestMail correspondents., downloaded from "https://web.archive.org/web/20090106142235/http://www.usebestmail.com/UseBestMail/Challenge_Response.html", Jan. 6, 2009.
Author Unknown, V@nquish Labs, "vqNow: How It Works", downloaded from "https://web.archive.org/web/20130215074205:/http:/www.vanquish.com:80/products/products_how_it_works.php?product=vqnow", Feb. 15, 2013.
Author Unknown, V@nquishLabs, How it Works: Features, downloaded from "https://web.archive.org/web/20081015072416/http://vanquish.com/features/features_how_it_works.shtml", Oct. 15, 2008.
Author Unknown, What is Auto Spam Killer, downloaded from "https://web.archive.org./web/20090215025157/http://knockmail.com:80/support/descriptionask.html", Feb. 15, 2009.
Author Unknown, White List Email (WLE), downloaded from "https://web.archive.org/web/20150912154811/http:/www.rfc1149.net/devel/wle.html", Sep. 12, 2015.
Brad Templeton, "Proper principles for Challenge/Response anti-spam systems", downloaded from "http://web.archive.org/web/2015090608593/http://www.templetons.com/brad/spam/challengeresponse.html", Sep. 6, 2015.
Danny Sleator, "Blowback: A Spam Blocking System", downlaoded from "https://web.archive.org/web/20150910031444/http://www.cs.cmu.edu/~sleator/blowback", Sep. 10, 2015.
David A. Wheeler, Countering Spam by Using Ham Passwords (Email Passwords), article last revised May 11, 2011; downloaded from https://web.archive.org/web/20150908003106/http:/www.dwheeler.com/essays/spam-email-password.html, captured on Sep. 8, 2015.
David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.
E. Zwicky, F. Martin, E. Lear, T. Draegen, and K. Andersen. Interoper-ability Issues Between DMARC and Indirect Email Flows. Internet-Draft draft-ietf-dmarc-interoperability-18, Internet Engineering Task Force, Sep. 2016. Work in Progress.
Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.
James Thornton, "Challenge/Response at the SMTP Level", downloaded from "https://web.archive.org/web/20140215111642/http://original.jamesthornton.com/writing/challenge-response-at-smtp-level.html", Feb. 15, 2014.
Karsten M. Self, "Challenge-Response Anti-Spam Systems Considered Harmful", downloaded from "ftp://linuxmafia.com/faq/Mail/challenge-response.html", last updated Dec. 29, 2003.
M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.
Marco Paganini, Active Spam Killer, "How It Works", downloaded from "https://web.archive.org/web/20150616133020/http:/a-s-k.sourceforge.net:80/howitworks.html", Jun. 16, 2015.
NIST. Usability of Security. http://csrc.nist.gov/security-usability/HTML/research.html.
Peter Simons, "mapSoN 3.x User's Manual", downloaded from "https://web.archive.org/web/20140626054320/http:/mapson.sourceforge.net/", Jun. 26, 2014.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
Ronald L. Rivest, "RSF Quickstart Guide", Sep. 1, 2004.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.

\* cited by examiner

2350

Hi, my name is Mr. James Smith, and I represent your long lost cousin, who recently died.

He has left you a huge sum of money. I need to transfer the money to your account immediately.

DETECTING PHISHING ATTEMPTS

CROSS REFERENCE TO OTHER APPLICATIONS

This application claims priority to U.S. Provisional Patent Application No. 61/878,229 entitled DETECTING PHISHING ATTEMPTS filed Sep. 16, 2014 which is incorporated herein by reference for all purposes.

BACKGROUND OF THE INVENTION

Individuals increasingly use electronic mail to communicate with one another for personal and business reasons. Unfortunately, unscrupulous individuals can use electronic mail for nefarious purposes, such as to send unwanted advertising email (e.g., SPAM) and perpetrate fraud against victims. One technique for protecting legitimate email users is the blacklisting of certain terms (e.g., "porn"), where the presence of a blacklisted term in a message automatically results in the classification of the message as SPAM. However, such techniques can be readily defeated by the unscrupulous individual. As one example, the unscrupulous individual may use terms that a human would recognize, such as "p0rn" or "p.o.r.n," but might not appear on a blacklist. Further, blacklisting of terms can be problematic in preventing fraud, where the goal of a fraudster is often to craft a message that looks as legitimate as possible (e.g., using only terms that commonly appear in legitimate communications). There therefore exists an ongoing need to protect against the victimization of legitimate email users.

BRIEF DESCRIPTION OF THE DRAWINGS

Various embodiments of the invention are disclosed in the following detailed description and the accompanying drawings.

DETAILED DESCRIPTION

Figure 1:
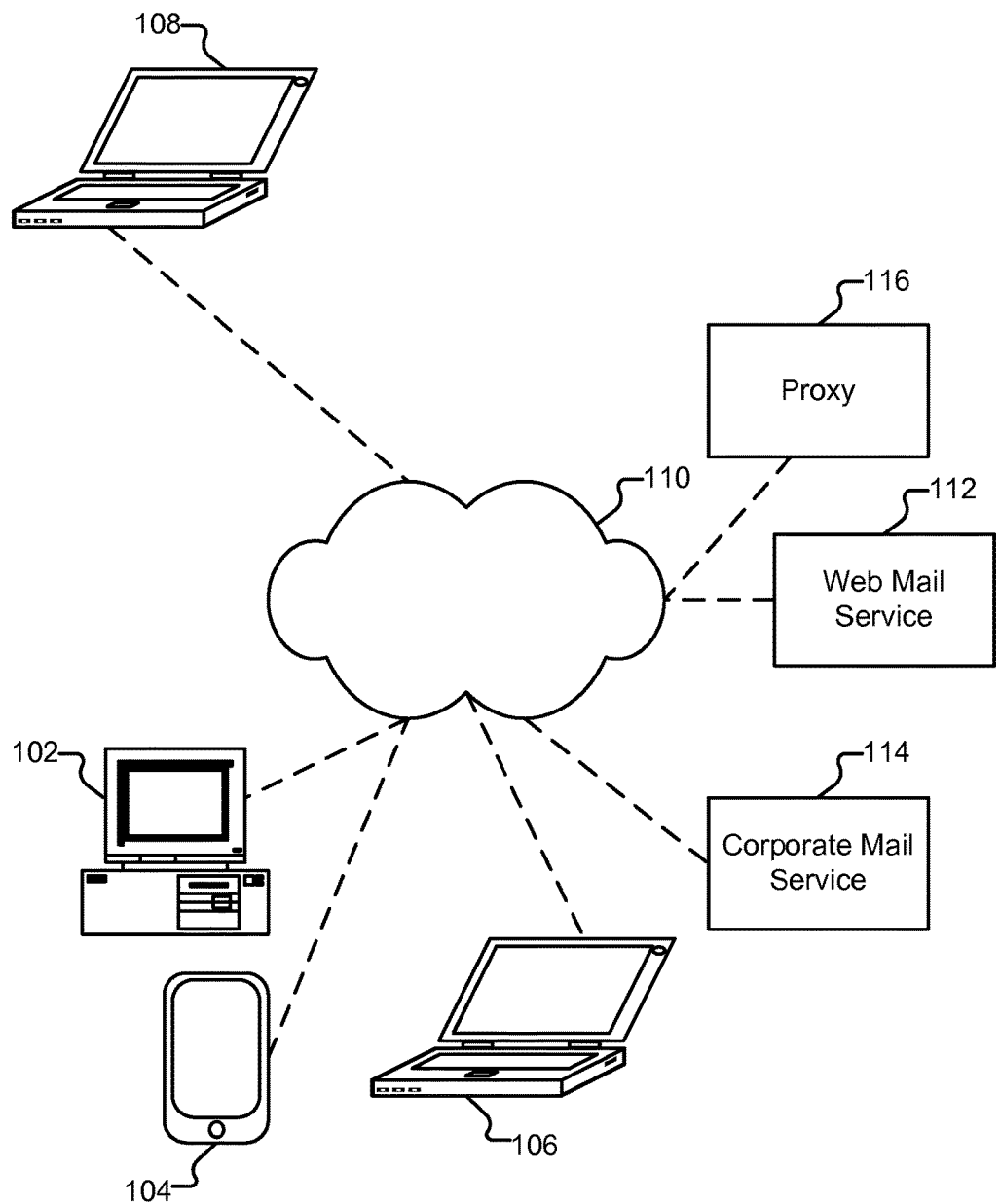
FIG. 1 illustrates an embodiment of an environment in which users of computer and other devices are protected from communications sent by unscrupulous entities.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Disclosed herein are techniques for detecting a large class of phishing-attempt communications (e.g., emails, SMSes, and other messages) that incorporate human-readable content indications of association of a message with an authoritative entity (such as a bank or other financial services provider, shipping/postal carrier, cellular or other utility provider, etc.) to appear to be legitimate/trustworthy to a recipient. Examples of such human-readable content indications include content that is displayed to a user, such as the sender email address, the sender name, the message text, and any graphics or audio associated with the message (whether incorporated into or linked to by the message). Suppose "ACME Bank" is a legitimate bank. A phishing-attempt communication (also referred to herein as a "message") might incorporate any/combinations of the following into the communication: the term "ACME Bank" (or similar) in the sender name or email, images with likenesses of text or logos associated with ACME Bank, text segments or images with contents matching to a large extent messaging used by ACME Bank (e.g., "ACME Bank of America") but not by any other actual legitimate entity, and/or references to web addresses containing material that renders to any such information.

As will be described in more detail below, techniques disclosed herein can be used to combine an assessment of the likely end-user interpretation of the message (including the apparent sender email address, friendly/display name, and message content) with an assessment of whether the apparent sender matches the actual sender, and to take actions in response, such as filtering actions or reporting actions. This approach incorporates what end-users will interpret a message as being with system information about the message, determining discrepancies, determining matches with unwanted descriptions, and initiating actions to remedy the problem.

FIG. 1 illustrates an embodiment of an environment in which users of computer and other devices are protected from communications (also referred to herein as "messages") sent by unscrupulous entities. In the environment shown, a user of client device 102 (hereinafter referred to as "Alice") has an email account provided by web mail service provider 112. Alice visits provider 112's website with her computer (via one or more networks/network types, depicted collectively in FIG. 1 as a single network cloud 110) to read and write email. Alice also accesses her email account via mobile phone 104. A user of client device 106 (hereinafter referred to as "Bob") has an email account provided by his employer (i.e., hosted by corporate mail server 114) and also has an account with provider 112.

A nefarious individual (hereinafter referred to as "Charlie") uses client device 108 to perpetrate fraud on unsuspecting victims. In particular, Charlie is a member of a criminal organization that engages in a variety of email scams. One example scam is a phishing scam, in which criminals contact unsuspecting Internet users using messages that appear to be authored by legitimate entities such as banks, with the goal of tricking the victims into clicking on links in the messages and providing banking credentials (e.g., usernames and passwords) or other sensitive information. In addition to, or instead of collecting sensitive information from victims, nefarious individuals can use phishing-attempt communications to trick victims into clicking on links that result in drive-by-downloads or other harmful consequences. Phishing messages can be particularly problematic because they often contain text, logos, or other symbols that users associate with legitimate messages. Further, such messages often include statements that are successful at encouraging users to interact with them, such as "you need to change your password," or "please confirm your account information is correct," or "you've received a payment, click here to log into your account and confirm receipt."

In contrast to typical SPAM messages which may contain readily blacklistable terms like "porn," one of the reasons that a phishing scam message is successful at tricking victims is because it appears to be a legitimate message from a trustworthy entity. Terms frequently present in a phishing message, such as "bank" or "account" are also very prevalent in legitimate email. Indeed, a phishing message might appear to a recipient to contain, verbatim, the text of a legitimate message sent by a legitimate entity (but, e.g., contain one or more different URLs or mailto links to harmful resources instead of legitimate ones). The degree of possible customization of scam messages makes it particularly difficult for existing email filters to provide sufficient protection, as evidenced by the ongoing success of such scams.

Described herein are techniques for protecting vulnerable users from malicious entities such as Charlie. In particular, as will be described in more detail below, communications are examined and classified by a classification platform 200, which can be operated as a single, standalone device, and can also be at least partially incorporated into a variety of the components shown in FIG. 1, or other components (e.g., not shown in FIG. 1) as applicable.

In addition to protecting phishing attempts, other abuses can be protected against using techniques described herein. For example, potential misuse of trademarked terms or logos can be flagged, where such terms/logos appear in messages not transmitted by the rights holder. Further, different configurations can be selected from in implementing the techniques described herein. As one example, platform 200 can determine the extent to which different abuses are covered by different parameter choices for a given user after reviewing some email traffic to and from the user in question, by running for a period of time, and/or by statistical methods that compare the user to similar users using the technology. It is possible to start with one configuration and change to another configuration if the first one is not appropriate, whether, e.g., because it is believed to remove desired communications or because it fails to remove communication that is a risk to the vulnerable user. This can be determined among other things from direct feedback from the protected vulnerable user; by manual or automatic scrutiny of quarantined messages, where it is determined what portion of this traffic was legitimate; and/or by scrutiny of the contents and quantity of the mail that is identified as bad. This provides an opportunity to change the settings over time to make them more appropriate for a given protected user (or group of users, such as an enterprise organization), or to adopt the protection features to a changing problem, as the circumstances and exposure of the protected user change.

The techniques described herein can be incorporated into a variety of systems, in a variety of ways, and in various combinations. For example, Alice's web browser (e.g., on client 102 or client 104) can be configured to use a plugin whenever she accesses mail service 112. The plugin can be configured to perform at least some of the techniques described herein as being performed by platform 200. As another example, a client-side filter can be included on client device 106 and configured to scan/filter all, or a portion of the incoming/outgoing traffic of the device (e.g., traffic between corporate mail service 114 and/or web mail service 112, irrespective of what type of mail client is used by Bob to access his mail). In yet other embodiments, a regular mail client (e.g., Microsoft Outlook) is modified to support at least some of the techniques described herein. Accordingly, it is to be understood that, while some techniques are described herein as being performed by platform 200, such techniques can be performed in a variety of environments, by a variety of devices, whether working standalone or in cooperation with other devices.

The techniques herein can also be provided by service providers (e.g., operating embodiments of platform 200 or configuring their infrastructure to cooperate with embodiments of platform 200). For example, Alice's ISP, web mail service 112, and corporate mail service 114 can each/all provide services in accordance with the techniques described herein. In particular, existing infrastructure provided by the service provider(s) can be adapted to provide at least some of the services described herein, or such services can be provided by one or more separate modules. For example, at least a portion of the functionality of platform 200 can be provided as a gateway (e.g., such that all of the mail of an enterprise is filtered by such a gateway as it arrives/is downloaded). As another example, the functionality of platform 200 can be provided at least partially by a milter (e.g., such that some portion of message processing is performed for free on behalf of an ISP, and any usage above that portion is charged to the ISP based on a contractual agreement). As yet another example, such services can be provided by proxies. The proxies can be controlled by the service providers (e.g., on premises), and can also be provided by a third party as an external service to the service provider. Service providers may opt to provide the services described herein to all users, and can also provide the services on a per-user basis. As one example, Alice could choose to "opt-in" to having web mail service 112 provide her with protections, while Bob could choose to forgo having web mail service 112 provide him with protection. As another example, Alice's ISP might automatically enroll her in protection services (e.g., based on her age or other demographic information indicative of her being particularly vulnerable, or based on any prior history of Alice having been victimized in an email scam). Bob, having different characteristics, would not automatically be enrolled (but could nonetheless be offered the ability to opt-in).

In some embodiments, a proxy 116 performs scanning/filtering services on behalf of users as a third party subscription service. For example, Alice's daughter "Eve" can purchase a subscription on behalf of her mother, Alice, or Alice might purchase a subscription for herself. As another example, Bob can purchase a subscription for himself, or his employer might subsidize the subscription on his behalf. As yet another example, customers of an entity, such as ACME Bank, or a particular credit card, or other company, can be offered a subscription (whether complementary, at a discounted rate, etc.) by the entity. The proxy is configured with the user name(s) and password(s) or other credentials for the email accounts to be protected as needed. The usernames/credentials can be collected in a variety of ways. As one example, the user (e.g., Alice) can be explicitly asked to provide them. As another example, the information can be automatically collected on her behalf. The proxy can then access the account(s) periodically, or screen and filter traffic as it is being sent to and from the subscribed user.

In situations such as where services are provided by a third party (e.g., protections for Alice's account with web mail service 112 are provided by third party proxy 116), a filter can be used in order to avoid polling the email service provider (e.g., service 112) too often, which could be considered abusive/disruptive to the operation of service 112. One way to provide such filter services is by changing the DNS lookup tables associated with the client device, and thereby causing all traffic to be filtered by the proxy as it is being downloaded from web mail service 112 to the client device. Another approach is to augment the access functionality on the client device so that proxy 116 is notified when the client device attempts to access the account. As it is being notified, it performs the filtering activity. In yet other embodiments, proxy 116 provides a middleware component to device 102, where the middleware component catches calls made by the mail reader program (or browser) residing on the client device and then initiates a call to the web mail service 112. In yet other embodiments, the proxy mimics a client device that is constantly logged in and is polling for updates at a frequent but reasonable rate, such as once every minute.

In various embodiments, combinations of the components described above are used. For example, Alice can be protected both by a plugin or executable installed on client device 102, and one or more external protection services (e.g., offered by her ISP, by proxy 116, or by web mail service 112). In this scenario, Alice will be protected both when she uses her client computer 102 to read her mail, and also when she checks her mail in other places, such as at a library terminal or hotel kiosk. Finally, while the techniques described herein are generally described in conjunction with evaluating email communications, other forms of communications can also be monitored/filtered as applicable. For example, instant messaging clients can monitored (whether at the client, via a proxy, or at a server), and messages being sent to/from the protected user on such services treated in a similar way as is described for the emails, as applicable. SMS/MMS messages are another example of communications that can be screened/managed using the techniques described herein. Other communication technologies can also be monitored and filtered, as applicable. For example, automated voice recognition techniques can be used in conjunction with the screening of voicemail messages (e.g., in conjunction with a service such as Google Voice) or calls, and escalation involving human review could be performed (e.g., with the consent of the callee).

—Communication Classification Platform—

Figure 2:
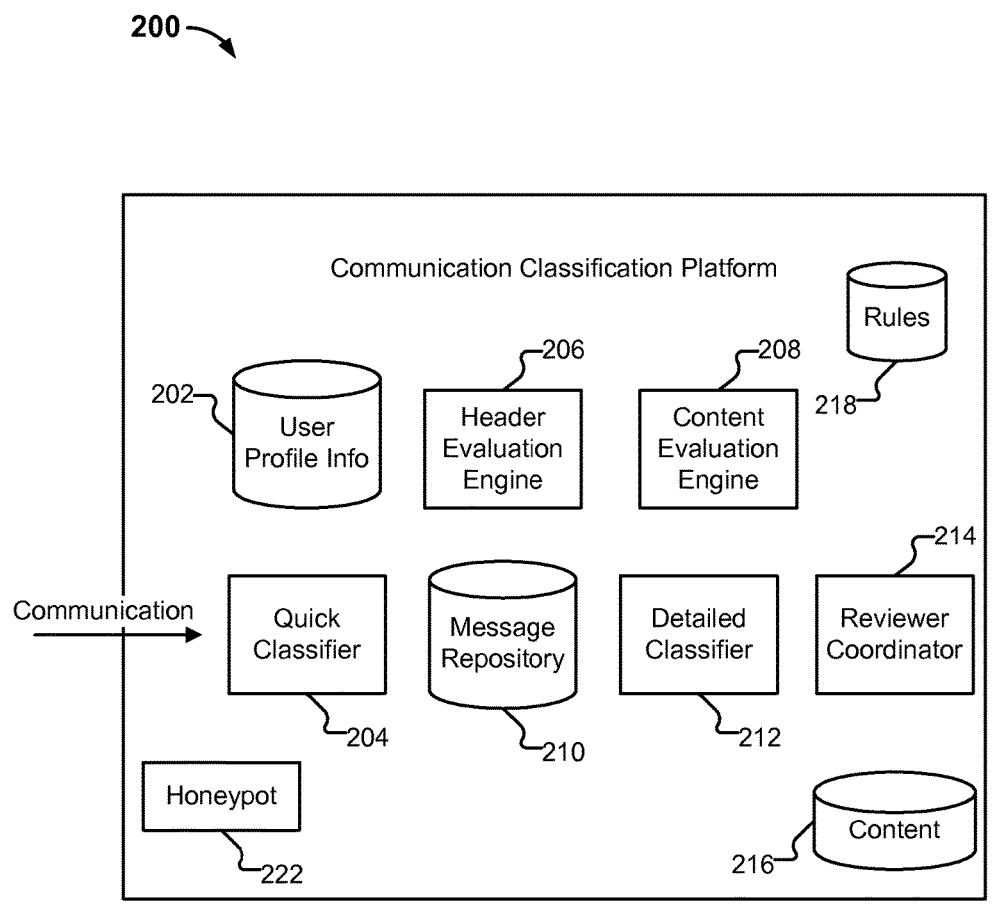
FIG. 2 depicts an embodiment of a communication classification platform.

FIG. 2 depicts an embodiment of a communication classification platform. As shown in FIG. 2, platform 200 can comprise a single device, such as standard commercially available server hardware (e.g., with a multi-core processor, 4+ Gigabytes of RAM, and one or more Gigabit network interface adapters) and run a typical server-class operating system (e.g., Linux). Platform 200 can also be implemented using a scalable, elastic architecture and may comprise several distributed components, including components provided by one or more third parties. As explained above, platform 200 (or portions thereof) can be incorporated into a variety of different components depicted in the environment of FIG. 1. As one example, all or portions of platform 200 may be provided by web mail service 112. As another example, portions of platform 200 may be located on client (or other) devices, such as client device 102 and portions not located on the client device may be omitted, or provided by a third party, as applicable.

In some embodiments, platform 200 includes a database 202 of user profile information. As one example, where proxy 116 implements platform 200, database 202 could include, for each user of the proxy, the user's username/password information for sites that are proxied. Database 202 can also include information such as the user's credit card information (where the proxy is run as a paid service), contact information, and any user-specific customizations. Examples of such customizations include user-specific whitelists (and any contextual information used to construct those lists, such as temporal information associated with message exchange), scoring thresholds, etc., described in more detail below. As another example, where client device 102 implements platform 200, database 202 can be implemented as one or more configuration files specific to the user(s) of the device. Further, in some embodiments communications for all users are handled the same way, and database 202 (and/or user-specific profile information) is omitted, or reduced in scope, as applicable.

In some embodiments, when platform 200 receives a communication for processing, the communication is provided to quick classifier 204. Header evaluation engine 206 evaluates any headers associated with the communication. Examples of information evaluated by engine 206 include: the sender/originator of the communication (including email address and friendly/display name), the apparent location and IP address of the sender, and the type of domain used by the sender. The header evaluation engine can also evaluate circumstances associated with the communication transmission, such as the time of day it was received, and whether it appears to be a first contact with the user, or a subsequent communication. Content evaluation engine 208 evaluates the content of the communication. As will be described in more detail below, two types of evaluation are performed. The first type of evaluation is an evaluation of the likelihood a potential viewer of the content would conclude that the content was sent on behalf of an authoritative entity (e.g., whether a text segment, a corresponding image, or combination thereof matches, to a threshold extent, messaging used by a given authoritative entity). As will be described in more detail below, "collection of terms"-based evaluation is one way that a determination can be made about whether message content would appear to have been sent by an authoritative entity. In various embodiments, platform 200 includes a content database 216 (or other appropriate data storage or set of data storages) that includes collections of terms associated with various authoritative entities (e.g., national banks, payment services, etc.) as well as graphical and/or other media associated with those entities (e.g., logos, fonts, and style sheets). The contents of database 216 can be provided by a single provider (e.g., tasked with creating collections of terms and collecting logos/trademarks/etc. of legitimate authoritative entities) and can also be provided by (and/or managed by) multiple providers (e.g., authoritative entities can make use of APIs or other mechanisms to submit collections of terms and/or media associated with their respective brands/identities) to platform 200. Techniques described herein can also be overlayed on or combined with other content-matching techniques.

The second type of evaluation is an evaluation of the likelihood the content was in fact sent on behalf of that authoritative entity.

In some embodiments, platform 200 includes a honeypot engine 222 configured to collect fraudulent messages, along with their sender information, by generating traffic from one or more honeypot accounts; and collecting and evaluating traffic to such accounts. The indications of fraudulent activity derived from these actions can be used to help improve the filtering of messages received by real users.

In some embodiments, a tertiary classification (e.g., "bad," "good," and "undetermined") is made based on the performed evaluations (and, if applicable, taking into account any user-specific information). Where the result of the evaluation is "undetermined," the communication is optionally stored in repository 210 and provided to detailed classifier 212 for enhanced processing. In some embodiments, quick classifier 204 is provided by one entity (e.g., is located on device 102 or provided by an entity such as corporate mail service 114), and detailed classifier 212 is provided by another entity (e.g., is provided by a third party operator of platform 200, proxy 116, an ISP, or other applicable entity).

In various embodiments, quick classifier 204 and detailed classifier 212 employ different classification techniques. For example, quick classifier 204 may rely solely on white/blacklists (e.g., requiring less than one second to process a message), while detailed classifier 212 may employ machine learning or other more sophisticated/resource-intensive automated review techniques (e.g., requiring two minutes of processing per message). In some embodiments, detailed classifier 212 makes use of one or more human reviewers instead of or in addition to performing automated analysis. For example, review coordination engine 214 can make available a copy of the communication to one or more human reviewers, who determine whether the communication appears to have been sent on behalf of an authoritative entity. Examples of such communications include banks statements/notices from banks, online merchants, and others, instructing a user to take an action. An example of a kind of communication a reviewer would not classify as appearing to have been sent on behalf of an authoritative entity is a typical human-human message (e.g., a message sent by Bob to Alice. The reviewer feedback is provided back to detailed classifier 212, which uses the information to determine a final disposition/classification of the message. In some embodiments, when a message is sent out for human review, the conclusion of the human review decides the disposition of the message. In other embodiments, the human classification is treated as one factor of a score (e.g., worth 50 points). The reviewers may comprise a variety of individuals, including paid employs of the operator of platform 200, other users of platform 200 (e.g., who perform reviews in exchange for a discount/rebate on services), a family member (e.g. Eva on behalf of Alice), and/or members of a third party outsourcing platform, such as Amazon Mechanical Turk. In some cases, such as where the human analysis is performed by a trusted entity within an organization (e.g., a member of the IT department reviewing an email sent to Bob at his work address), the full text of the message may be provided to the reviewer. In other embodiments, the message is partially redacted prior to being provided to a reviewer.

Figure 3:
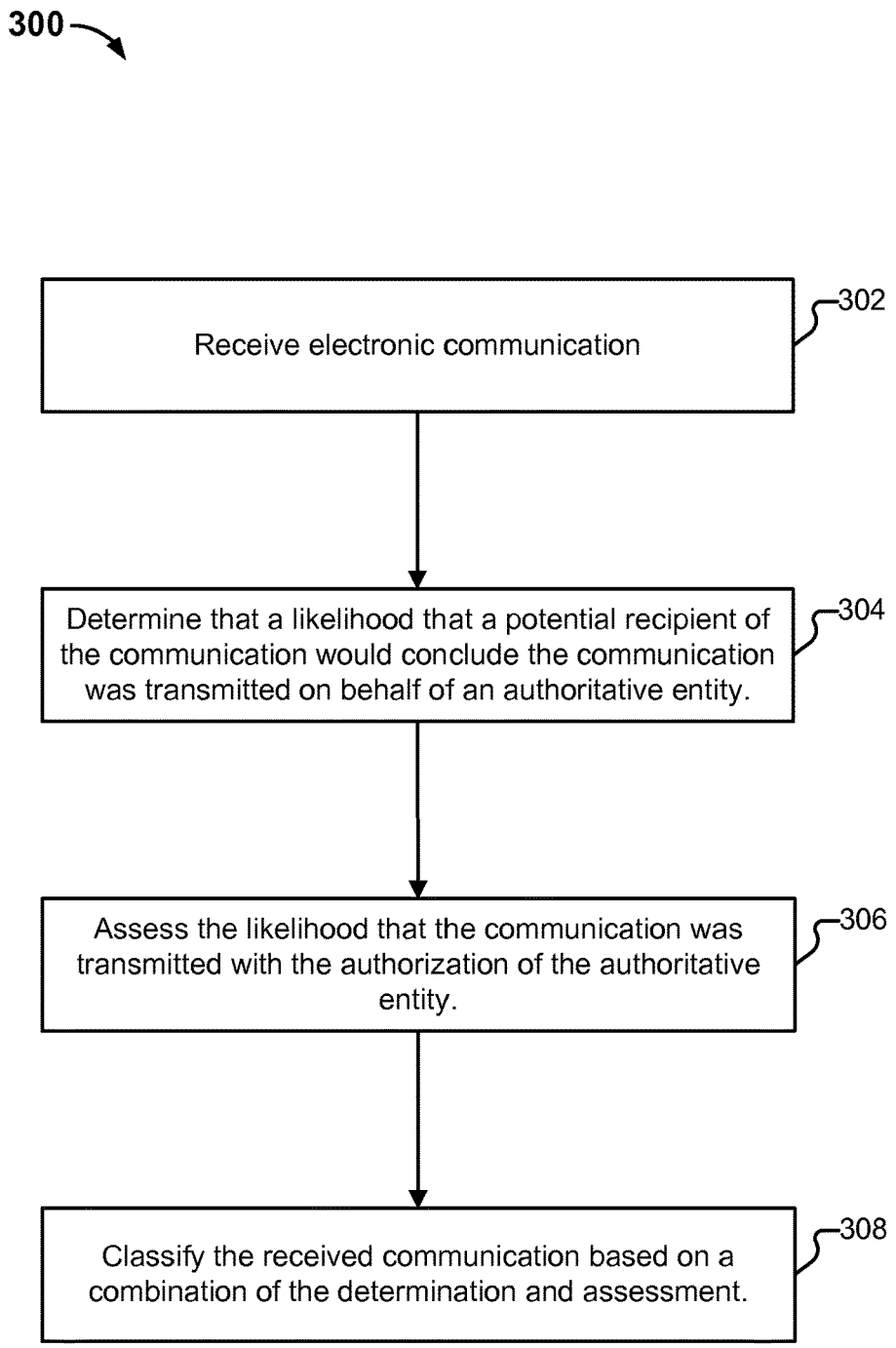
FIG. 3 illustrates an example of a process for classifying communications.

FIG. 3 illustrates an example of a process for classifying communications. In some embodiments, process 300 is performed by platform 200. As explained above, other embodiments of platform 200, and other devices/combinations of devices, as applicable, can also perform process 300. The process begins at 302 when an electronic communication is received. As explained above, the communication can be received in a variety of ways, depending on where platform 200 is located/how it is configured. For example, where platform 200 is incorporated into corporate mail service 114, platform 200 can receive the communication in conjunction with the corporate mail service receiving the message. As another example, where platform 200 (or portions thereof) are incorporated into a mail client, such an embodiment of platform 200 can receive the message (along with other messages) when a user of the mail client starts the client. At 304, a determination is made as to the likelihood that a potential recipient of the communication would conclude that the communication was transmitted on behalf of an authoritative entity. Examples of authoritative entities include specifically named banks and other financial services providers, specifically named shipping/postal entities, and specifically named merchants/marketplace providers. Additional examples include non-specified entities purporting to be authoritative (e.g., a message from "Your Bank" or "Your Accountant" claiming that "your bank account details need updating" without naming a particular bank). One example of processing that can be performed at 304 is as follows: platform 200 matches a text component of a message (e.g., the header, content, or both) with a profile indicative of either a phishing attack (or other type of abusive email) or of a legitimate message from a legitimate, authoritative entity, resulting in an output comprising one or more domain names or other identifiers of parties associated with the text component, or an indication that the message does not match any such parties. As described in more detail below, one way the text component can be evaluated is by use of a "collection of terms," where such a collection is indicative of at least one of a particular type of abuse; the identity of one impersonated authoritative entity or message sender; and the identity of one legitimate authoritative entity or message sender.

At 306, platform 200 performs an assessment of the likelihood that the received communication was in fact transmitted with the authorization of the purported authoritative entity (e.g., if the message claims to come from "ACME Bank," did it in fact come from ACME Bank or one of its associates, or was it sent by Charlie). One example of processing that can be performed at 306 is to determine whether there is a match of the sender information and the one or more domain names or other identifiers produced at 304. Technologies such as Domain-based Message Authentication, Reporting, and Conformance (DMARC) or DomainKeys Identified Mail (DKIM) can be used as part of this determination. Another approach is to determine the sender information based on the delivery path associated with the message, where any atypical delivery path is indicative of the message being spoofed. For example, a delivery path is atypical if it involves a node that is believed to be compromised, has a poor reputation (e.g., as recorded in a local or third party provided database of known suspect/malicious IP addresses), or which is not on the expected path between the claimed sender and the message recipient, based on how messages typically are transmitted.

Finally, at 308, the message is classified based on the outcome of the processing performed at 304 and 306. As one example, a security determination is made at 308 based on the processing performed at 304 and 306. This security determination can be used to select a course of action, including one or more of delivering the message, filtering out the message, placing the message in a spam folder, notifying a third party of the message or aspects of it, such as from where it was sent, and notifying a third party of statistics relating to one or more messages that have been processed. As explained above, one security determination can be that the message is a phishing attempt (e.g., a malicious individual is trying to trick a target into taking an action under the false belief the message was sent by a legitimate entity). A second security determination can be that the message is inappropriately using text/images associated with a legitimately entity (e.g., a potential trademark or copyright violation). Different actions can be taken based on the outcome of the security determination, as will be described in more detail below.

In addition to matching against words, other context can also be matched against, instead of or in addition to. For example, matching the intention, story associated with, or type of action requested in the message, can all be performed, such as by using equivalence techniques described in more detail in the "collection of terms" section below. As one example, to match a story in which a recipient is told that he or she has to perform an action associated with her account or there would be negative consequences, one can detect words "immediately," "log in," and "account." Instead of "immediately," one can also detect any word or term with a similar meaning or intent, such as "as soon as possible" or "within" and "hours." Instead of "log in," one can detect either "access," "verify," or "authenticate." Similarly, instead of "account," one can detect "profile" or "information." If not all of these terms occur in a message, the presence of other indicators, such as logos or URLs that may be deceptive due to containing part of the domain name of the authoritative entity can be used as indicators of sufficient certainty (i.e., above a threshold amount) that a message is likely to give an impression of being associated with a given authoritative entity. An example of a deceptive URL is www.evilhacker.com/acmebank-login since it contains a string that is similar to "ACME Bank." Another deceptive URL is one where the text URL that is displayed to the end user is significantly different from the URL of the hyperlink, e.g., they are associated with different domains. This is particularly deceptive if the domain of the hyperlink is a domain that is associated with fraudulent behavior, or if the displayed domain is a domain that corresponds to a commonly phished brand. As another example, the sender address of a message is human-readable content to some users who pay attention to the email address of the sender. Thus, if the sending email address is "acmebank@yahoo.com" (which is not an address that officially belongs to ACME Bank, but rather, belongs to whatever Yahoo user who registered it) or "acme@banking. com" can also be used as indications associated with ACME Bank. Similarly, if the "friendly name" (or "display name") associated with an email address has a strong relationship to an authoritative entity's name, then it can also be considered to be an indication. For example, if the owner of the account, "joe@gmail.com," sets a friendly name that is "ACME Bill Payment," then the friendly name is considered to be indicative of content associated with ACME Bank. In some embodiments, automatic parsing of a message is performed by platform 200 to determine whether the contents sufficiently match a profile associated with a legitimate authoritative entity, such as ACME Bank. Platform 200 determines whether it is plausible that a potential recipient would believe that the message originated from or was legitimately sent with the permission of the authoritative entity.

In some embodiments, platform 200 outputs a score associated with an association to an authoritative entity, indicating the probability that the content will appear legitimately related to the authoritative entity to a typical user, according to a selected assessment. As one example, a message with text that closely corresponds to a common ACME Bank email message (e.g., a monthly statement reminder), or an email containing logos closely resembling the ACME Bank logo would result in higher scores than an email message that says "Hi there!" and nothing else, but where the friendly address associated with the sender is "ACME Bank." One way of determining such a score is by associating a value with each rule in a rule set, and outputting the highest score of the rules that are triggered by a message. In some embodiments, such rules are stored in database 218 (or any other appropriate store) on platform 200, and are configurable, such as by an administrator of platform 200. Another way of determining the score is to use a function of the individual scores, such as a weighed sum of them. In one example, a first rule corresponds to one collection of terms of the message portion; a second rule corresponds to another collection of terms of the message portion; a third rule corresponds to a collection of terms associated with the friendly address. The following are three examples, where the higher the score, the more likely a human recipient would perceive the message as having been sent by an authoritative entity.

Example 1: a first rule states that if a communication contains the terms "log in," "within XX hours" (where XX represents a number), and one of the words: "alert," "notification," or "security," then the message is assigned a score of 85.

Example 2: a second rule states that if a message contains the terms "security alert" and "log in" then the message is assigned a score of 40.

Example 3: a third rule states that if a message contains the term "ACME Bank" or the friendly address of an email contains the word "ACME," and the message contains an image component that matches the logo of ACME Bank, then the message is assigned a score of 100. Example ways the image match can be performed include using edge detection techniques, color pattern analysis, optical character recognition, and/or combinations of such techniques, as well as any other image comparison techniques (e.g., which are robust against typical modifications of images, such as cropping, rotating, resizing, adding or removing elements). Note that while a phishing email containing an ACME Bank-related image would cause this rule to be triggered, so would typical legitimate messages sent by ACME Bank that contain ACME logos.

In some embodiments, to prevent attackers from using misspellings to evade detection, each term corresponds to an equivalence class containing common versions of the term. For example, the equivalence class for "ACME Bank" contains "A-C-M-E Bank," "AKME Bank," and "ACMAY Banc." Any such term in a message is therefore mapped to the term "ACME Bank," and considered equivalent to that term during the evaluation of the rules. Moreover, in some embodiments, the processing of a message by platform 200 includes performing a normalization preprocessing wherein case is adjusted (e.g., to all lower-case or all upper-case, as applicable), misspellings corrected, and where characters with similar appearance are mapped. An example of the latter is that the digit 0 is mapped to the letter O whenever surrounded by letters. Some characters are also mapped to multiple other characters. For example, the digit 1 is mapped both to a capital i and a lowercase L in the context of other letters, e.g., "Flash Bank" is replaced by "Flash Bank" and "Fiash Bank." This replacement can be performed in a local copy of the message being evaluated, and can also be performed implicitly by determining whether either of the two resulting terms is an existing term associated with any rule.

Friendly/display names and email addresses can similarly be parsed to determine matches (e.g., using collection of terms rules, equivalence analysis, etc.). For example, a friendly/display name can be parsed by breaking the string into components, where the components are words and non-word characters, and where these components are compared to the components of a collection of terms rules. For example, one such rule can specify the terms "ACME" and "Bank," which would cause all of the following friendly/display names to trigger the rule: "ACME BANK," "AC ME BANK," "BANK OF ACME," "aCME BANK," etc. By including misspellings in the equivalence classes of "Bank," the following friendly/display names would also trigger the rule: "ACME Banking," "ACME Bankers," "ACME Bnk," etc. In some embodiments, the distance between a target authoritative entity name and a name in an email address or friendly address is computed and compared to a threshold, where the comparison triggers a rule if the difference is smaller than a threshold that may be specific to the authoritative entity. The distance measure can take a variety of forms, including, one of an edit distance, a Hamming distance, or a similar distance metric. In some embodiments, a support vector machine is used to detect friendly addresses and email addresses that are indicative of a given target authoritative entity, such as ACME Bank, after being trained with large numbers of common friendly/display names used by fraudsters to imitate the target authoritative entity. A support vector machine can also be used to identify human-readable content indicators associated with various authoritative entities, and trigger rules if a sufficient similarity (e.g., more than 75%) is detected.

In some embodiments, to parse message content, URL content, email address content, and/or friendly/display name content, a variety of pre-processing is performed on the content. One example is mapping images to text or labels using optical character recognition (OCR) techniques, which would map an image looking like the text "ACME" to the text "ACME," or a label associated with ACME Bank. This way, attackers would not be able to evade the text parsing methods (e.g., based on identifying a collection of terms) by making some key terms non-detectable. Another example is to identify logos and map them to text or labels corresponding to the logos—such as mapping images bearing a sufficiently strong resemblance to the ACME Bank logo (e.g., using a threshold amount of 75%) to a text "ACME" and to a text "ACME Bank", or to a label associated with ACME Bank. Another form of parsing is separating content into words or other components, including by identifying separating spaces, characters, change in colorization, and by identifying substrings that are recognized as words. For example, this would cause an input string "A-C-M-E B.a.n.k" to be replaced by "ACME Bank" as the separating characters (in this case - and .) are removed. An another example, consider a text "ARC-MOE! Boa nuke" in which some characters ("R—O ! o u e") would be colored in the same or a similar color as the background, and the remaining characters ("A C M E B a n k") would be colored in a substantially different and clearly visible color. In this example, the parsing would replace the characters that are hard to see with spaces or other separating characters, after which these would be parsed and removed, resulting in a text "ACME Bank" or corresponding label. Alternatively, these two processing steps can be performed together, automatically eliminating the separating characters that are not visible to a typical observer. Yet another form of processing is normalizing including case, spelling, and removing or normalizing punctuation.

An additional kind of normalization can further be performed, in which terms that are considered equivalent are mapped to one or more representative of the terms. For example, the term "login" may be considered equivalent to "log in" and "log-in", and all three represented as "login", or a label associated with this term. This extends beyond simple spelling variants; for example, the term "log in" may be considered equivalent to "respond," "reply," "let us know," "update," and "confirm," even though these words do not have the same meaning. The equivalence would instead be based on how these different terms may be used by a scammer to achieve one and the same general goal, which in this example is to make the user react to the message, performing a action that includes typing her credential. Then, exclusion areas are identified, where these exclusion areas can be configured to include User Generated Content (UGC), headers, and service-provider specific exclusion areas. Anything within these areas is considered separately, or ignored. Then, the normalized terms from the non-excluded areas are processed to identify collections of terms, and the associated scores are computed. Given one or more such scores, an output score is computed. For each type of assessment (e.g., logo-based, collection of terms based, etc), a score is generated. In some embodiments, the result is a vector. For example, the vector can contain three elements, where the first is a logo-based score, the second is a collection of term based score, and the third score indicates the amount of apparent obfuscation was detected, where the latter may include the number of almost-invisible characters that were dropped. In one example, this score vector may be (55, 64, 32), where 55 is the score indicating to what extent the message contains logos that are similar to known logos of authoritative organizations, such as ACME Bank. 55 may correspond to a 55% certainty that there is such a logo. Moreover, 64 is the score from the collection of terms component, and indicates a badness of the message, which may be on another scale than 0 to 100, but in this example case is a number from 0 to 100. 64 is corresponds to the badness of one collection of terms that was found—where each collection corresponds to a number indicative of its perceived risk. Finally, 32 is the score indicating the estimated amount of obfuscation detected, where in this example case, four points is assigned to each character that is found to have been obfuscated, and 8 characters in this example were deemed to be obfuscated. The score vector (55,64,32) is then used to perform a security determination that may depend on user settings, settings by the user's bank, settings set by the system, settings set by the user's employer, and potentially other settings. In this example, the corresponding message is determined to be a scam. Other aspects of the message, such as headers and hyperlinks, can be reflected by elements of the vector. For example, one additional element of the vector may indicate the risk associated with the headers, and yet another the risk of at least one hyperlink. Yet other aspects of the message can be reflected in other parts of the score vector.

In some embodiments, platform 200 outputs an array of scores, or a score vector, containing identifiers associated with authoritative entities and scores associated with authoritative entities, for scores exceeding a threshold minimum score required to be reached in order for the authoritative entity identifier to be included in the output. In this scenario, the content of the message is the message (i.e., not counting the headers), and human-readable refers to content that is understood by typical human users, such as texts and logos (as contrasted with complicated URLs).

One example of a machine-readable indication that a message is not associated with an authoritative entity (e.g., determined as part of the assessment performed at 306) is the absence of a digital signature expected to be present in a message from the authoritative entity, and associated with the authoritative entity. For example, if ACME Bank typically authenticates all of its outgoing messages with DKIM (which is an industry standard), but a given message is not authenticated with DKIM, or is authenticated using another organization's DKIM key, or using an expired or revoked or known leaked DKIM key, then this is an indication that the message is not from ACME Bank. Information pertaining to ACME Bank's use of DKIM can be stored in database 216 or any other appropriate location, and, as with other content stored in database 216, can be obtained/provided by a third party (e.g., on behalf of multiple authoritative entities) and can also be supplied by a representative of ACME Bank (e.g., a network administrator). As another example, suppose that ACME Bank commonly sends messages that contain hyperlinks to a small set of domains, such as domains that they own or operate, or which are owned or operated by collaborators of or vendors associated with ACME Bank. As with other information associated with ACME Bank, the list of collaborator/vendor domains can be included in database 216 for use in analysis of messages by platform 200. If a message has at least one hyperlink that is not associated with such a domain, then this can be indicative of the message not being sent by ACME Bank. Further, platform 200 can determine degrees of certainty of such a mismatch, e.g., if a message contains a hyperlink to a webpage that is not associated with a given authoritative entity, such as ACME Bank, but where the webpage hosts content indicative or reminiscent of ACME Bank, then this can be used as a sign of abuse. If the hyperlink is associated with a domain that is not a well-known and respected domain in a business that could potentially be associated with ACME Bank, then that can also be used as a strong indication of abuse, albeit less strong than as an obvious phishing page. Platform 200 can output a score associated with the lack of machine-readable association with one or more authoritative entities (e.g., at 306 in process 300), and used as an indicator of the probability that the content is not related to the authoritative entity (e.g., at 308 in process 300).

Suppose that if a communication contains the term "ACME Bank" and any hyperlinks, then a risk score is increased by 75 points. Further, if the text associated with the hyperlink contains at least one of the terms "log," "login," "log-in," "access account," or "my account," then the score is increased by an additional 20 points. If the message contains an image or hyperlink to an image matching the logo of "ACME Bank," (e.g., using image matching techniques described above) then the score is increased by another 50 points. Similarly, if a communication contains the term "your bank," and at least one of the terms "emergency," "immediately," or "within 24 hours," then the score is increased by 25 points. In this scenario, messages start out being assessed a neutral score, such as zero. Depending on the score associated with the scanning of the content of a message, different actions are taken by platform 200, such as allowing the message to be provided to the recipient, quarantining the message, alerting an administrator, etc. Further, as explained above, the rules, associated scores, and threshold values can be adjusted (e.g., by an administrator of platform 200), whether on behalf of all users, or individual users, as applicable.

In some embodiments, some URLs are excluded from the scrutiny, such as URLs provided as UGC associated with the message. As one example, payment services, such as ACME Bank, may allow payers to include a message with a payment. Some authoritative entities may allow any form of UGC, including URLs and hyperlinks. The UGC element may always be located in an isolated portion of legitimate messages associated with the authoritative entity, and can be identifiable by being proceeded by a text such as "Message from payer"; have a maximum length; and only contain ASCII characters. In some embodiments, when an area matching such criteria is identified, the content of this area is excluded from the scan for machine-readable indications.

In some embodiments, platform 200 determines one or more authoritative entities that the human-readable content indication of a message is associated with (e.g., at 304), and determines whether the machine-readable indication is associated with one of these authoritative entities (e.g., at 306). If so, then the message is considered legitimate (e.g., at 308).

If this is not so, and one of the authoritative entities that the human-readable content indication of a message is associated with is on a watch-list, then the message is considered high-risk (e.g., at 308). In some embodiments, the risk is a value that is computed as a function of the scores corresponding to the human-readable content indicators and the scores associated with the machine-readable indicators, thus producing a probability assessment that the message is designed to deceptively appear to come from a sender that it does not come from.

Platform 200 can also be used for other classification tasks, such as to classify received messages to organizations, e.g., to determine whom to send messages to. For example, some messages that are sent to a general mailbox should be delivered to sales, as indicated by containing terms such as "purchase," "I would like to," whereas others should be delivered to customer service, as indicated by containing terms such as "very angry," and "lost." In this example, "I would like to" belongs to an equivalence class with other members such as "I want," and "very angry" belongs to an equivalence class that contains "upset," "am pissed," and common bad words. Unclassified messages are delivered to the general mailbox whereas messages classified based on their contents, as described above, are delivered to the proper department or person.

Platform 200 can also be used to classify risk notification emails, such as the messages that are sent to a spoof@ACMEBank.com email address, which contain large quantities of phishing emails that are forwarded by users to help ACME Bank defend against such threats, and which also contain large quantities of messages with hyperlinks leading to dangerous webpages, and which also contain large numbers of legitimate messages that were misunderstood by end users to be high-risk. These messages can be automatically classified by platform 200 or embodiments thereof (e.g., one operated by ACME Bank for such purposes). The use of this classification can speed up and improve the quality of the sorting, which might otherwise be performed using other, lesser-quality techniques, or even manual sorting. Depending on customizable factors such as the associated weight or risk probability values of classified messages, automatic actions are taken on some, such as responding to the sender with a message explaining that the message was not high-risk, and that it can be trusted, or escalating review of it inside the receiving organization or an organization receiving a feed of messages from the receiving organization.

Where the content portion of the message is assessed, but where the original sender information may not be available (e.g., if the message does not have long headers and the delivery path, DMARC information and/or other sender or delivery information is unavailable to be assessed), platform 200 can generate an assessment based on previous and related messages, based on static system parameters, and based on indications that are still present, such as information about the mismatch between domain names used in hyperlinks and one or more institutions associated with the content portion of the message. For example, if the message contains words, logos (whether identical to or substantially similar to official entity logos), or references to either of these (indicating a relationship to ACME Bank), but hyperlinks indicate a relationship to at least one domain that is not associated with ACME Bank or which is not commonly associated with legitimate emails, then the sender assessment engine uses this information to make a classification and a risk assessment, in lieu of information regarding delivery path and DMARC information. Such information is also used in context where full or partial information about delivery path and DMARC data is available.

The following is an example of processing that can be performed by platform 200. First, an electronic communication is received (e.g., at 302 of process 300). The message is normalized, and the evaluation of one or more rules matching the content of the message is performed, where collections of terms are used as well as determinations of images contained in or referenced by the message, as well as variants of such techniques. For each rule that is triggered, a descriptor and a score is generated. For example, suppose a message matches a first rule referred to as the "ACME Bank rule 1" and a score of 80 is assigned as part of the evaluation of the rule. This score depends both on the degree to which the message matches the template associated with the rule, and the severity of the rule being matched. Moreover, the same message matches a second rule, referred to as the "Generic Bank rule 45," and a score of 40 is assigned. This score, too, depends on the degree to which various components associated with this rule are matched, and the score associated with those components, which in turn designates the severity of the rule being matched. This second rule may be a general version of the first rule, or may be unrelated to the first rule, as applicable.

Next, it is determined (e.g., at 306) that the message is not sent by ACME Bank. It is also not sent by any whitelisted entity. In various embodiments, the whitelist is stored on platform 200 or otherwise made accessible to platform 200.

Next, a security determination is made (e.g., at 308). Since the "ACME Bank rule 1" was triggered with a score exceeding a first threshold (e.g., which is set to 5), and the message was not sent by ACME Bank, then the message is filtered out and not delivered to any users who have opted in for removal of known bad messages (e.g., as specified in database 202), and placed in the spam folder of all other users. In some embodiments, in addition, ACME Bank is notified (e.g., using information stored in database 216 along with other information associated with ACME Bank such as collections of terms and logos) once per day of the number of messages that were filtered out pertaining to it, along with the headers describing the delivery path of these messages. Further, since the "Generic Bank rule 45" was matched with an associated score of at least a second threshold set to 25, and the sender was not one of the entities on the whitelist, then the message is designated to be placed in the spam folder of all users (unless it already has a higher designation, which it does for some users due to the matching of the "ACME Bank rule 1" rule), and a regulator is notified of the number of such matches at the end of the month. The time at which the action (e.g., filtering out, notification, inclusion in statistics and notification) is associated with each security determination rule, such as those described above.

Additional examples of message classification using embodiments of platform 200 are as follows:

A determination is made that a first example message is a phishing message. This is because first example message contains language that is commonly used in phishing emails.

A second example message is also determined to be a phishing message, based on the fact that it mimics a message associated with XYZ Bank, but is found not to have been sent by XYZ Bank. This is determined based on the fact that XYZ Bank supports DMARC (as known and recorded in database 216), and therefore digitally signs all outgoing messages, but the second example message is not digitally signed by XYZ Bank.

A third example message is also identified as a phishing message, since it contains language and logos indicative of having been sent by ABC Savings, but the message delivery path is inconsistent with the third example message having been sent by ABC Savings. This is knowable since ABC Savings is a regional bank located in Oregon, and all ABC Savings messages are either sent directly by ABC Savings or one of their affiliates in Nebraska, and the delivery path of the third example message indicates that the third example message was originated in Alaska, and moreover, that one of the nodes on the message delivery path has a low reputation, indicating that it is commonly used by fraudsters. Again, information about ABC Savings' (and affiliates) servers/paths can be stored/maintained in database 216 or other appropriate location, as can reputation information about other entities such as about the low reputation node. Such information (e.g., reputation information) can also be obtained from a third party reputation service or other provider, as applicable.

A fourth example message is found not to be a phishing email, in spite of having a content portion that is identical to that of the first example message. The fourth example message, however, was associated with a valid digital signature indicating that it was sent by XYZ Bank.

A fifth example message also contains language associated with XYZ Bank, but it does not have any language indicative of being a phishing email. Instead, it is a message stating that the sender has a new bank, and wishing the recipient a Happy New Year. The fifth example message is not flagged as being a phishing message, but since it contains language specified by XYZ Bank, and associated with potential copyright/trademark infringement, it is flagged to be manually reviewed by an organization receiving flagged messages to review (whether associated with platform 200, or as a separate service with which platform 200 or embodiments thereof communicates). This organization determines that the fifth example message is harmless, and simply makes note of having processed the message. At the end of a billing period, XYZ Bank will pay a small amount associated with the review of the fifth example message by the organization.

A sixth example message is largely identical to the fifth example message, both in terms of the content portion and the sender portion, but is not reviewed by the review organization since the fifth example message was already reviewed. Instead, it is just counted so that it is included in the report sent to XYZ Bank. XYZ Bank will not have to pay for manual processing of the sixth example message.

A seventh example message contains language and imagery associated with potential copyright/trademark infringement. This is found by an automatic processing similar to that of the fifth example message, and a manual review by the review organization. After the review is completed, XYZ Bank is notified, and requests that the seventh example message and all identical messages (e.g., similar within a threshold of at least an 85% match) are bounced and not delivered.

For an eighth example message, an automatic review and a manual review determines that the message matches content ABC Savings has specified as problematic (e.g., containing trademarked phrases pertaining to ABC Savings and/or images associated with ABC Savings as stored in database 216 by ABC Savings or its representative). The review organization notifies ABC Savings, which in turn sends a complaint to the sender of the eighth example message.

A ninth example message is a regular email sent by Alice to Bob, asking Bob if he wants to go to the movies. The ninth example message does not trigger any rules, and is therefore delivered to Bob.

A tenth example message contains an advertisement for a sexually explicit service, and is not allowed to be delivered to any recipients associated with Goody High School, according to rules specified by a representative of Goody High School on an embodiment of platform 200. The embodiment of platform 200 reviews the policies of Goody High School, and determines what rules are associated with this entity. A determination is made that the content portion of the tenth message contains language that matches at least one of these rules. Therefore, the tenth example message is not delivered, but bounced to the sender, with an explanation that the recipient does not allow sexually explicit material. A counter is also incremented, associated with the number of messages such as the tenth example message, that have been bounced during the last week, based on match the rule that the tenth example message matched.

An eleventh and twelfth example message contain identical content portions, which are product advertisements. Platform 200 determines that the stated recipient of the eleventh example message has paid to avoid all commercial email, whereas the stated recipient of the twelfth example message has not. The content portion of the eleventh message is determined to be a commercial message, based on matching at least one rule associated with commercial content, and the eleventh message is not delivered. Since the eleventh and twelfth example messages do not contain spam poison, a hash identifier is computed and associated with this content. When platform 200 determines that the stated recipient of the twelfth example message has requested not to receive any commercial email, it is verified whether the twelfth example message corresponds to the previously mentioned hash identifier. Since it is, there is no need to evaluate the rules on it, but the twelfth example message is determined to be unwanted, and is therefore not delivered.

Figure 4:
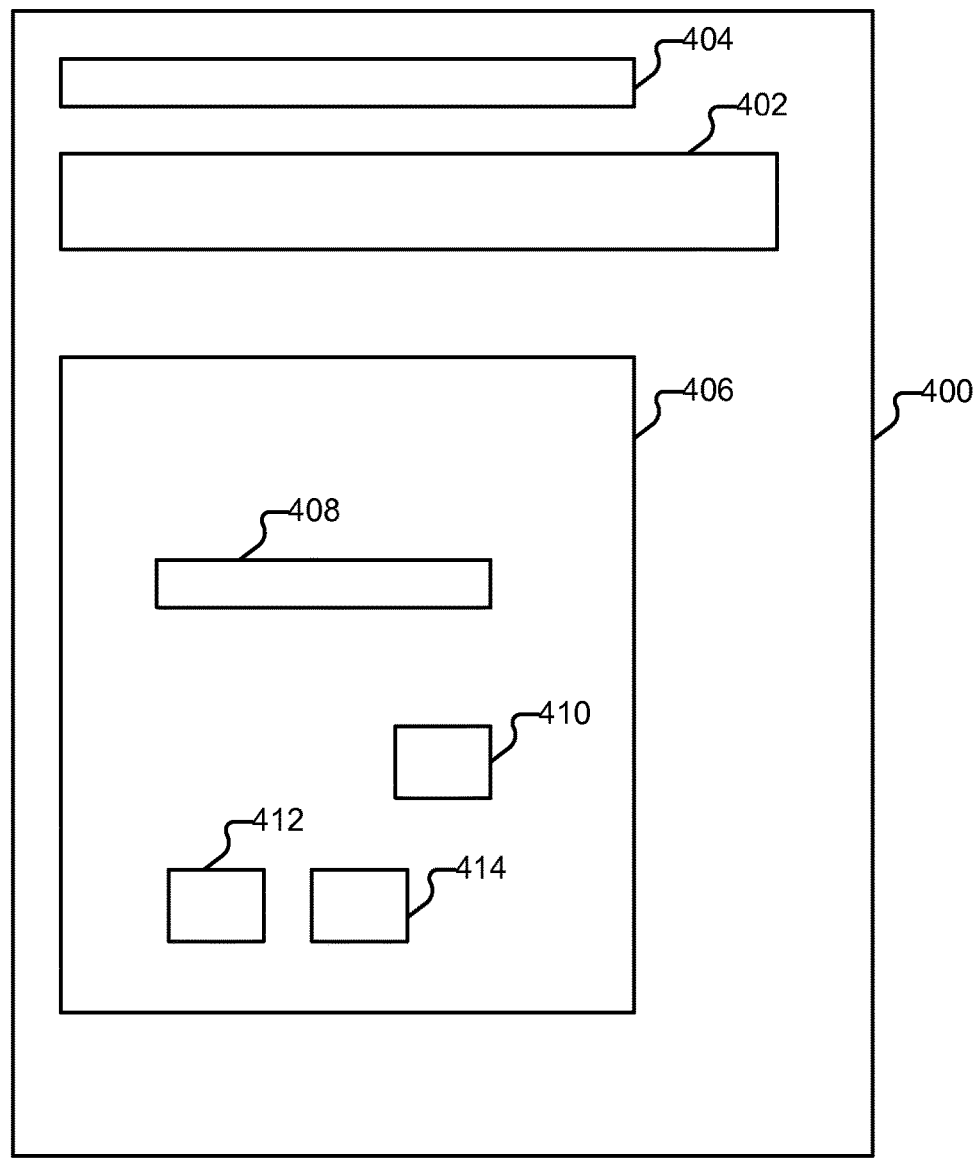
FIG. 4 shows an example of a legitimate message sent by a bank to a user.

FIG. 4 shows an example of a legitimate message 400 sent by Bank XYZ to a user such as Alice. Bank XYZ uses DMARC, corresponding to a machine-readable indication 402 and a sender address 404 associated with its domain. The content portion 406 has text 408 indicative of a funds transfer, a logo 410 corresponding to Bank XYZ, and two hyperlinks 412 and 414 that go to a page in Bank XYZ's domain and a page in the domain of a mortgage affiliate of Bank XYZ, respectively. Platform 200 will determine (e.g., at 304) that there is a high likelihood (e.g., one exceeding a predetermined threshold, such as 75%) that a potential recipient of message 400 will conclude the communication was transmitted on behalf of an authoritative entity (namely, Bank XYZ). Platform 200 will also assess (e.g., at 306) that there is a high likelihood (e.g., one exceeding a predetermined threshold, such as 65%) that the message was indeed transmitted by (or legitimately on behalf of) the purported entity (i.e., due to factors such as the presence of the DMARC information included in region 402). Thus, platform 200 would classify message 400 (e.g., at 308) as legitimate (e.g., based on the two likelihood scores).

Figure 5:
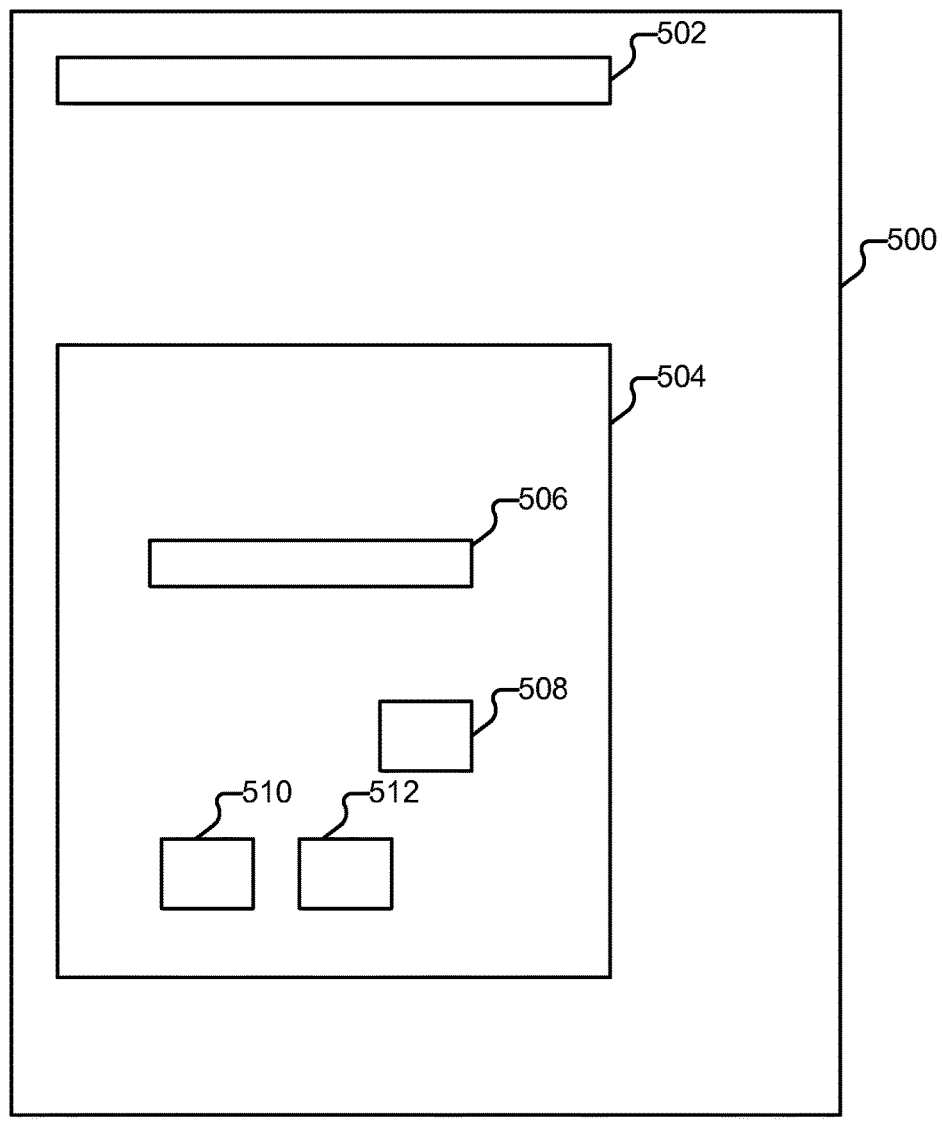
FIG. 5 shows an example of a scam message sent by a nefarious individual to a user.

FIG. 5 shows an example of a scam message being sent by Hacker A to a user such as Alice. Hacker A does not use DMARC (and thus message 500 is missing a section similar to section 402 of message 400). Hacker A uses a sender address 502 associated with a domain he controls. The content portion 504 has text 506 that is similar to (or identical to it, as applicable) text 408, indicative of a funds transfer, a logo 508 closely resembling logo 410 (or identical to it, as applicable), corresponding to Bank XYZ, and two hyperlinks 510 and 512 that lead to pages in Hacker A's domain. The first page (reached by link 510) bears a strong resemblance to Bank XYZ page 412. As with message 400, Platform 200 will determine (e.g., at 304) that there is a high likelihood (e.g., one exceeding a predetermined threshold, such as 75%) that a potential recipient of message 500 will conclude the communication was transmitted on behalf of an authoritative entity (namely, Bank XYZ). However, unlike with message 400, platform 200 will assess (e.g., at 306) that there is a very low likelihood (e.g., 5%) that the message was transmitted by (or legitimately on behalf of) the purported entity (i.e., due to factors such as the lack of the DMARC information, and URLs leading to suspicious domains). Thus, platform 200 would classify message 500 (e.g., at 308) as phishing (e.g., based on the two likelihood scores).

Figure 6:
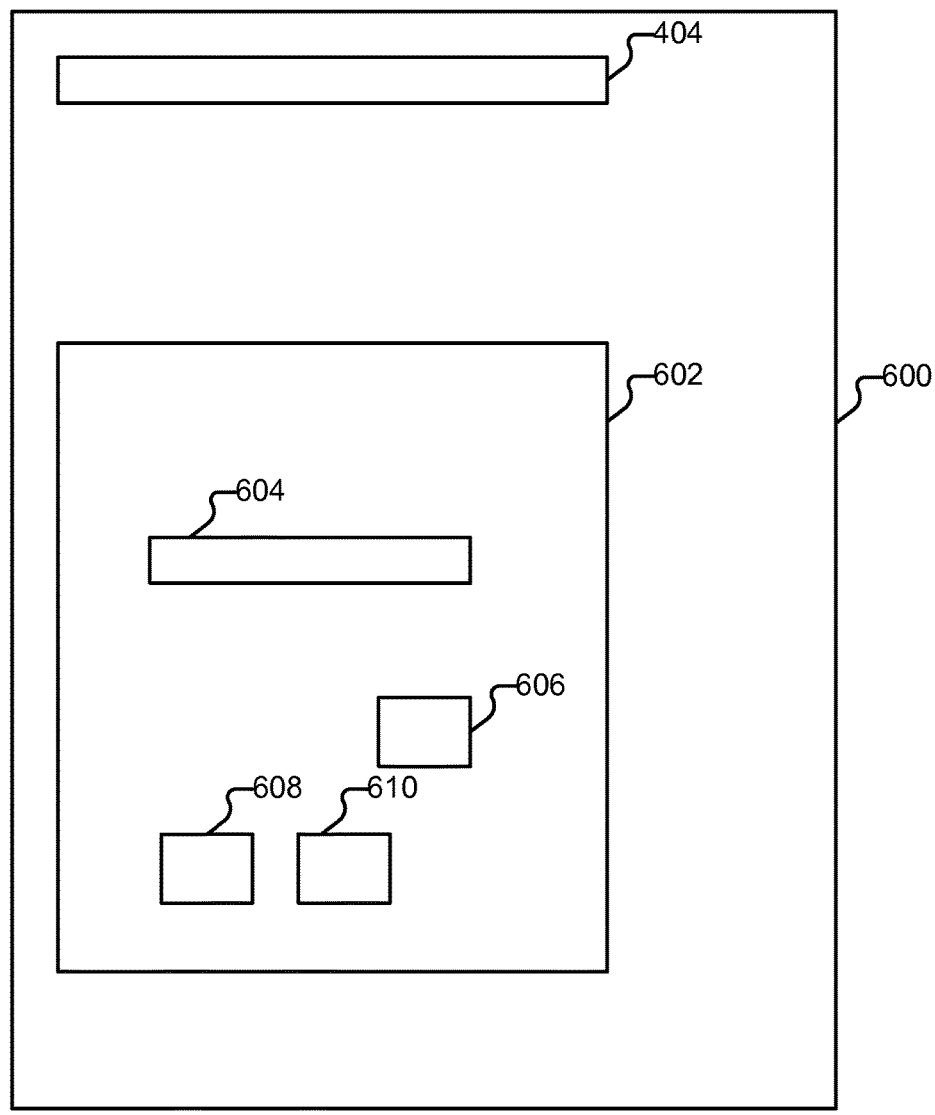
FIG. 6 shows an example of a scam message sent by a nefarious individual to a user.

FIG. 6 shows an example of a scam message 600 sent by Hacker B to a user such as Alice. Hacker B does not use DMARC. Hacker B spoofs Bank XYZ's sender address 404. The content portion 602 has text 604 corresponding to text 408, indicative of a funds transfer, a logo 606 that maps to XYZ when input to an Optical Character Recognition tool, and two hyperlinks 608 and 610 that lead to pages in Hacker B's domain. The first page (reachable by link 608) bears strong resemblance to Bank XYZ page 412. As with message 500, Platform 200 will determine (e.g., at 304) that there is a high likelihood (e.g., one exceeding a predetermined threshold, such as 75%) that a potential recipient of message 600 will conclude the communication was transmitted on behalf of an authoritative entity (namely, Bank XYZ). And, as with message 500, platform 200 will assess (e.g., at 306) that there is a very low likelihood (e.g., 5%) that the message was transmitted by (or legitimately on behalf of) the purported entity (i.e., due to factors such as the lack of the DMARC information, and URLs leading to suspicious domains). Thus, platform 200 would classify message 600 (e.g., at 308) as phishing (e.g., based on the two likelihood scores).

Figure 7:
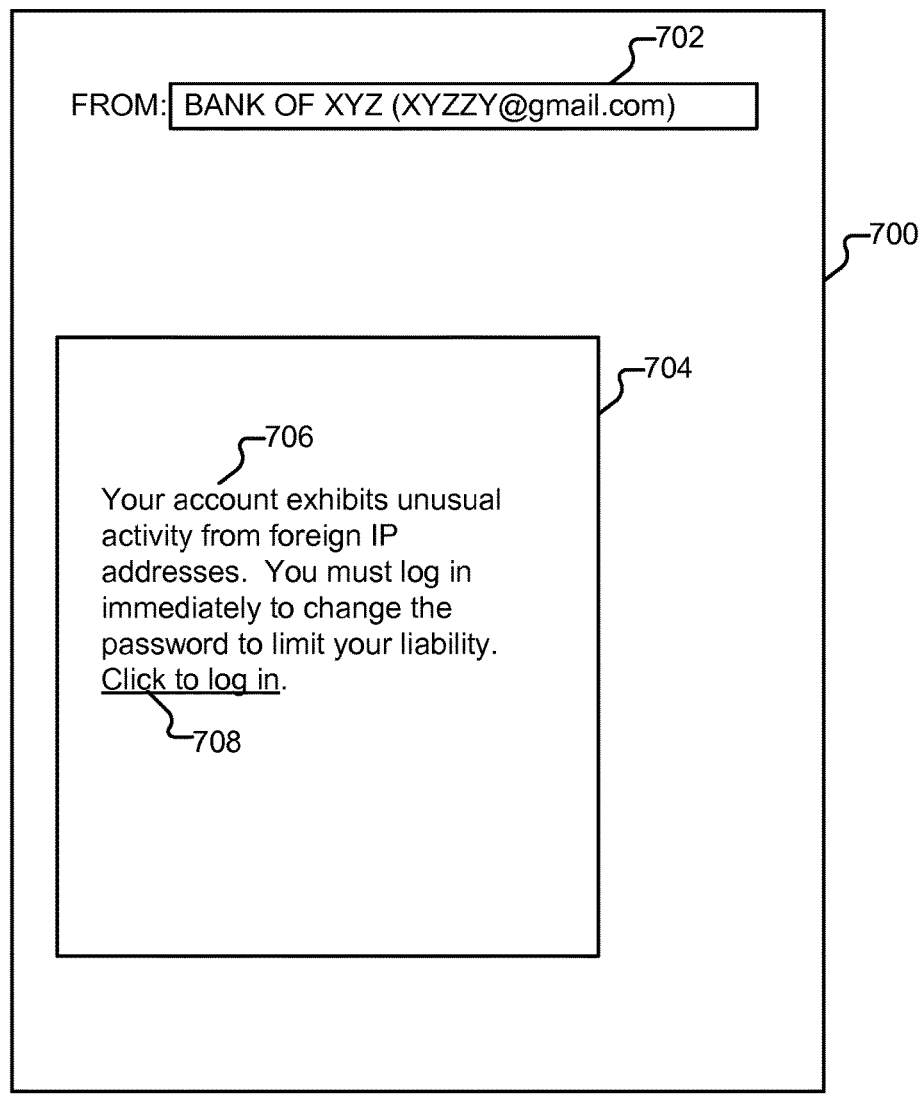
FIG. 7 shows an example of a scam message sent by a nefarious individual to a user.

FIG. 7 shows a scam message 700 sent by Hacker C to a user such as Alice. Hacker C uses a friendly address 702 that reads "Bank of XYZ" (but has an email address of XYZZY@gmail.com, which is not a legitimate email address the bank). The content portion 704 has text 706 that does not match any communication from Bank XYZ. The last sentence is hyperlinked (408) and leads to a page controlled by Hacker C if clicked. As with message 600, Platform 200 will determine (e.g., at 304) that there is a high likelihood (e.g., one exceeding a predetermined threshold, such as 75%) that a potential recipient of message 700 will conclude the communication was transmitted on behalf of an authoritative entity (namely, Bank XYZ). Here, the determination will be based on factors such as the friendly address, and a collection of terms associated with a general banking story (having to log in to change a password). As with message 600, platform 200 will assess (e.g., at 306) that there is a very low likelihood that the message was transmitted by (or legitimately on behalf of) the purported entity (i.e., due to factors such as the lack of the DMARC information, and URL leading to a suspicious domain). Thus, platform 200 would classify message 700 (e.g., at 308) as phishing (e.g., based on the two likelihood scores).

Figure 8:
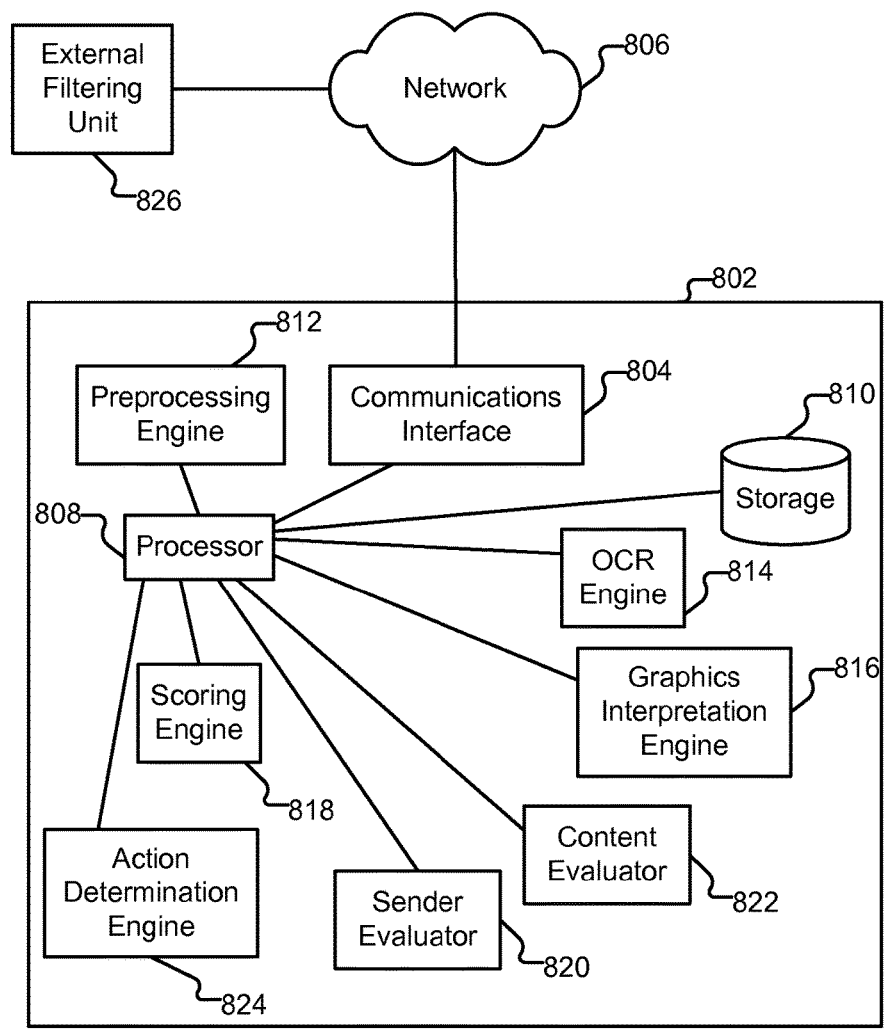
FIG. 8 shows an embodiment of a message classification platform.

FIG. 8 shows an embodiment of platform 200. Included in platform 802 is a communications interface 804, connected to one or more networks (depicted as a single network cloud 806), and further including at least one processor 808, a storage 810, a preprocessing engine 810, an OCR engine 812, a graphics interpretation engine 814 that processes images that contain non-text material and outputs a description, a scoring engine 816, an engine 818 that evaluates the sender information associated with messages, a content evaluation engine 820 that determines matches between messages and rules indicating how portions of the messages would be interpreted by typical users, and an action determination engine 822 that generates one or more recommendations of what to do with messages, where these recommendations are either consumed by processor 806 performing a local filtering process, or communicated over network 806 to an external filtering unit 826.

Figure 9:
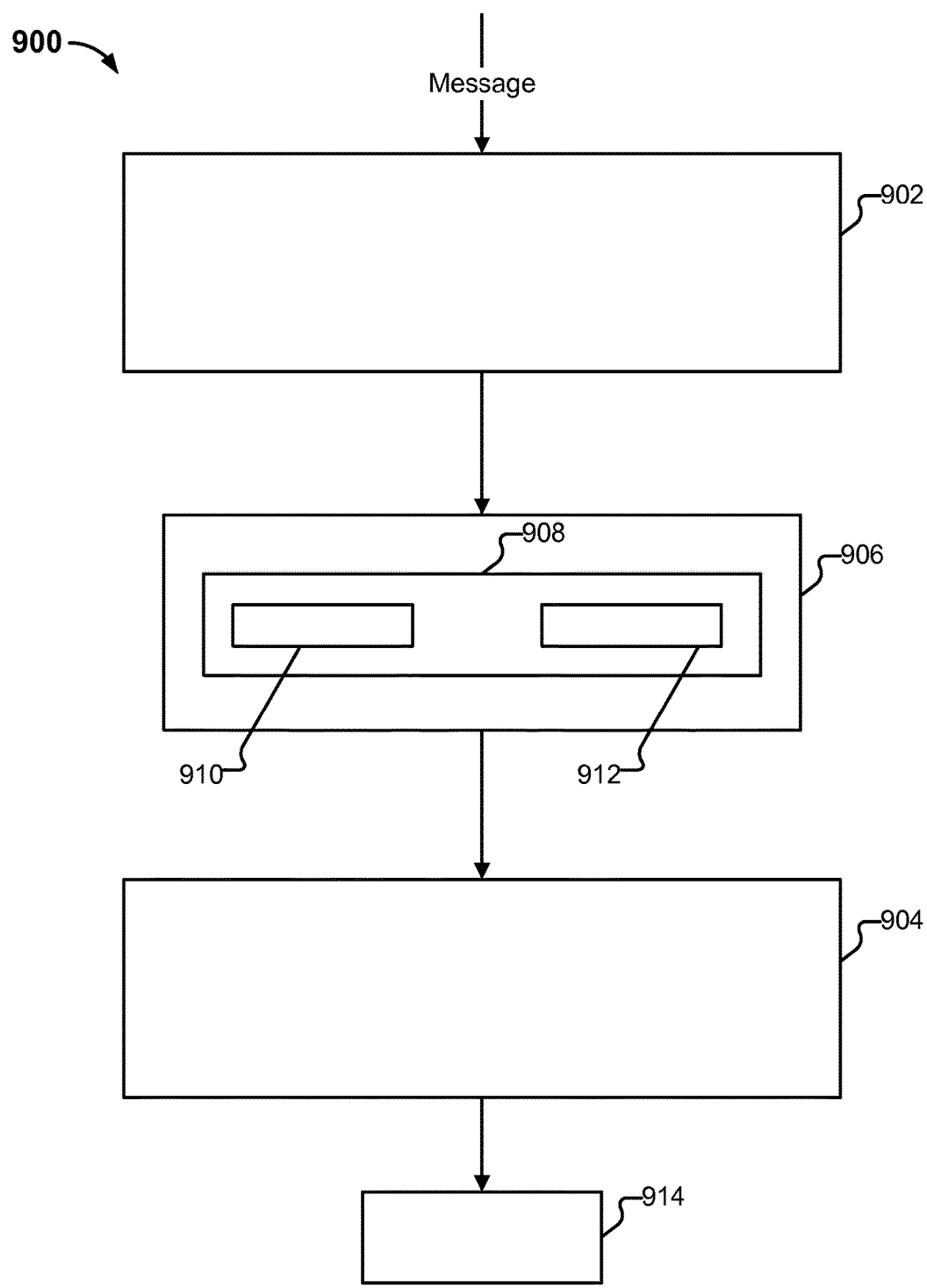
FIG. 9 shows an embodiment of portions of a message classification platform.

FIG. 9 shows an embodiment of portions of platform 200. Included in platform 900 are a component 902 and component 904. Component 902 takes as input a message and produces as output a vector 906 of pairs. Each pair, such as pair 908, includes a domain indicator 910 and a score 912, where the domain indicator 910 is a domain on a watchlist (e.g., watchlist 1108) and the score 912 is an assessment of the extent to which the domain indicator 910 is matched. For example, if the domain indicator corresponds to "ACME Bank" and this is a domain that is perfectly matched by the message, then score 912 may be 100, where this is a score between 0 and 100. If the domain indicator is "ACME Bank" and the message contains a text "ACNE Dank", then the score 912 may be only 80, where 80 indicating the relative similarity with the domain indicator 910 according to some measure, such as the edit distance, the Hamming distance, or a measure of how many characters were replaced by characters of sufficient similarity, where a list would contain that "M" and "N" are 90% similar, while "M" and "V" are only deemed to be 67% similar, and "M" and "Y" are only 44% similar, and so on. Using these assessments of similarity, a score 912 is generated, e.g., by multiplying all the similarity measures with each other and outputting the resulting product as the score 912. Component 904 takes as input the vector 906 and outputs a score 914 indicating whether the email has machine-readable indicators corresponding to any of the domain indicators 910, and where the score 914 also has a component that represents score 912. Here, score 914 may be the maximum of the scores 906 for all the different pairs of domain indicators 910 and associated scores 912. There would be multiple such pairs when there are multiple domains that are sufficiently similar to the message, where this similarity indicates the perceived risk that a user would believe that the message is associated with the domain. Component 902 performs processing that corresponds to portion 304 of process 300, as described above, while component 904 performs processing that corresponds to portion 306 of process 300.

Figure 10:
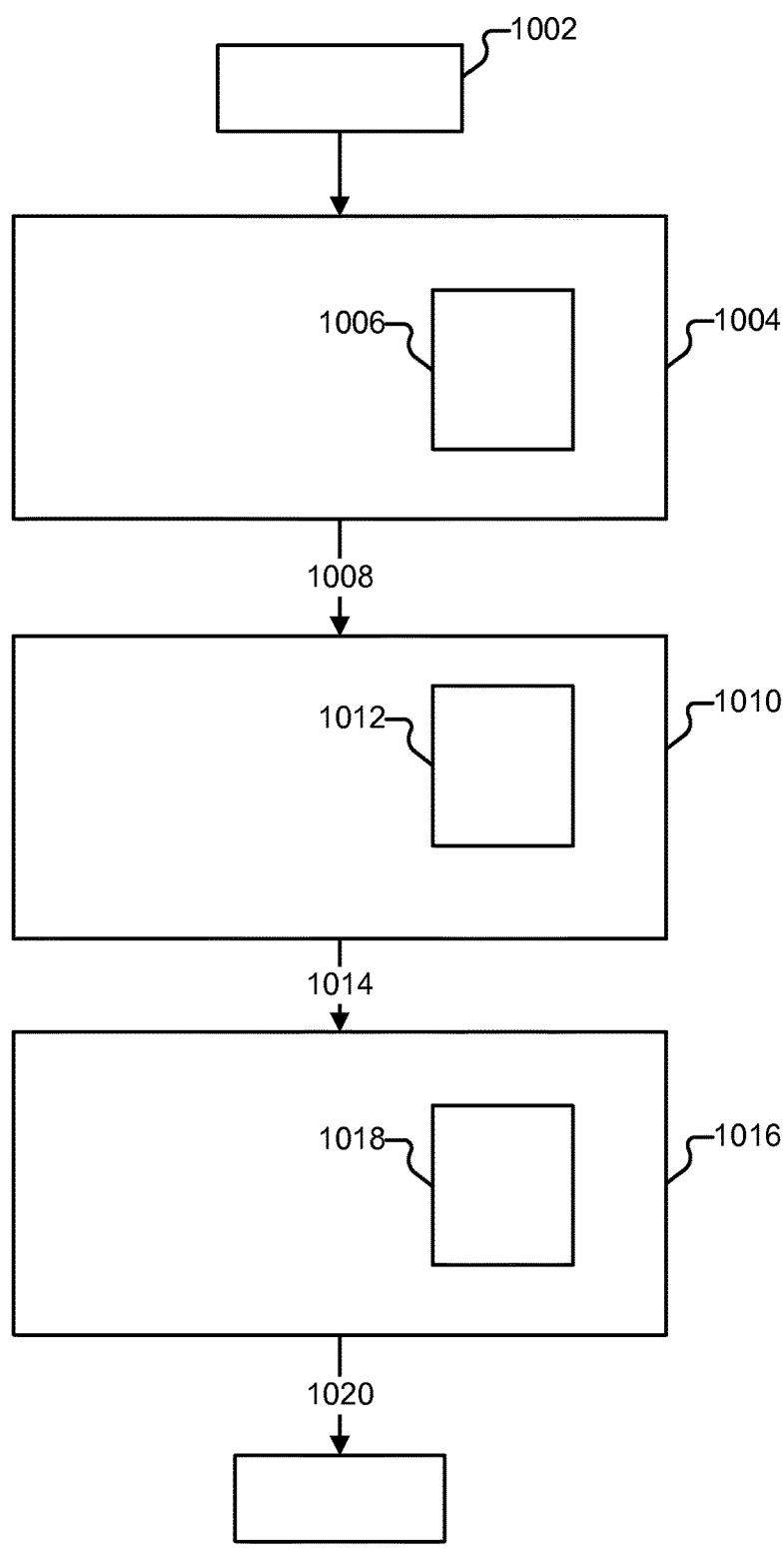
FIG. 10 shows an example of processing that can be performed on an electronic communication.

FIG. 10 shows an example of processing performed on a communication in some embodiments. A message 1002 is provided to a first component 1004. Component 1004 performs processing corresponding to portion 304 of process 300. Component 1004 includes a rule set 1006 that includes at least one of a collection of terms, rules associated with terms of the message content, the sender email address and the friendly address, images, and values used to generate risk scores as content elements are matched. Component 1004 uses (among other elements, as applicable) preprocessing engine 812, storage 810, OCR engine 814, graphics interpretation engine 816, scoring engine 818 and content evaluation engine 822. The output of component 1004 is a value 1008 that represents the result of the computation performed in component 1004, and which includes indicators of which rules were matched, and the associated scores that were computed. Component 1010 performs processing corresponding to portion 306 of process 300. Component 1010 includes a rule set 1012 associated with whitelisted authoritative entities, and is used to determine whether a message is sent by the apparent sender or not (e.g., based on a score indicating the likelihood). Component 1010 uses storage 810, scoring engine 818 and engine 820 evaluating the sender information associated with messages. In component 1010, the apparent sender of the message 1002 is determined. In some embodiments, determination of the apparent sender of the message is informed by what rules were matched in component 1004, as indicated by value 1008. The output 1014 of component 1010 is information associated with message 1002, value 1008, and the determination whether the apparent sender is matched with the actual sender. This output 1014 is the input to component 1016, which includes a rule set 1018 that determines, based on the value 1008 and the output 1014 what actions to take. Component 1016 uses among other elements storage 810, scoring engine 818 and action determination engine 824. The actions generated by action determination engine 824 in component 1016 correspond to output 1020.

Figure 11:
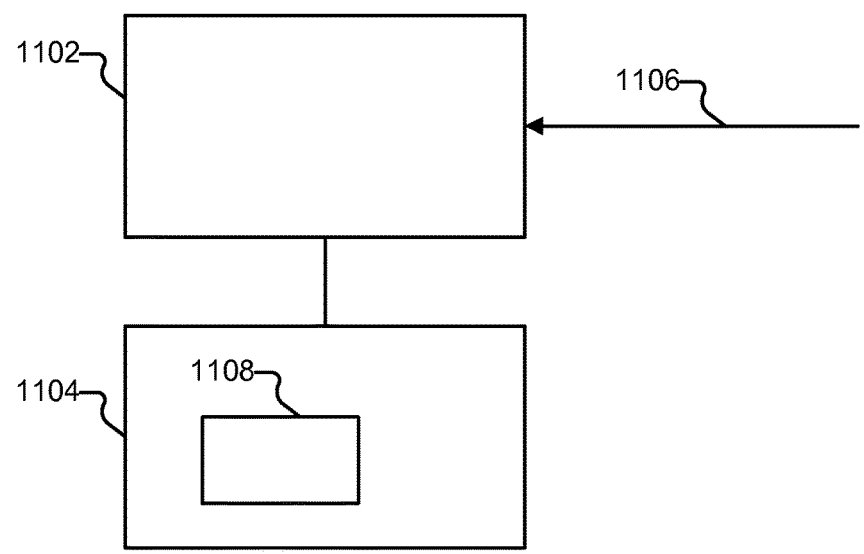
FIG. 11 shows components of an embodiment of an electronic communication classification platform.

FIG. 11 shows components of an embodiment of platform 200, including a processor 1102, a memory 1104 (which stores a whitelist 1108 and a program that executes an embodiment of process 300). Also included in FIG. 11 is a communication channel 1106 used to receive messages.

Figure 12:
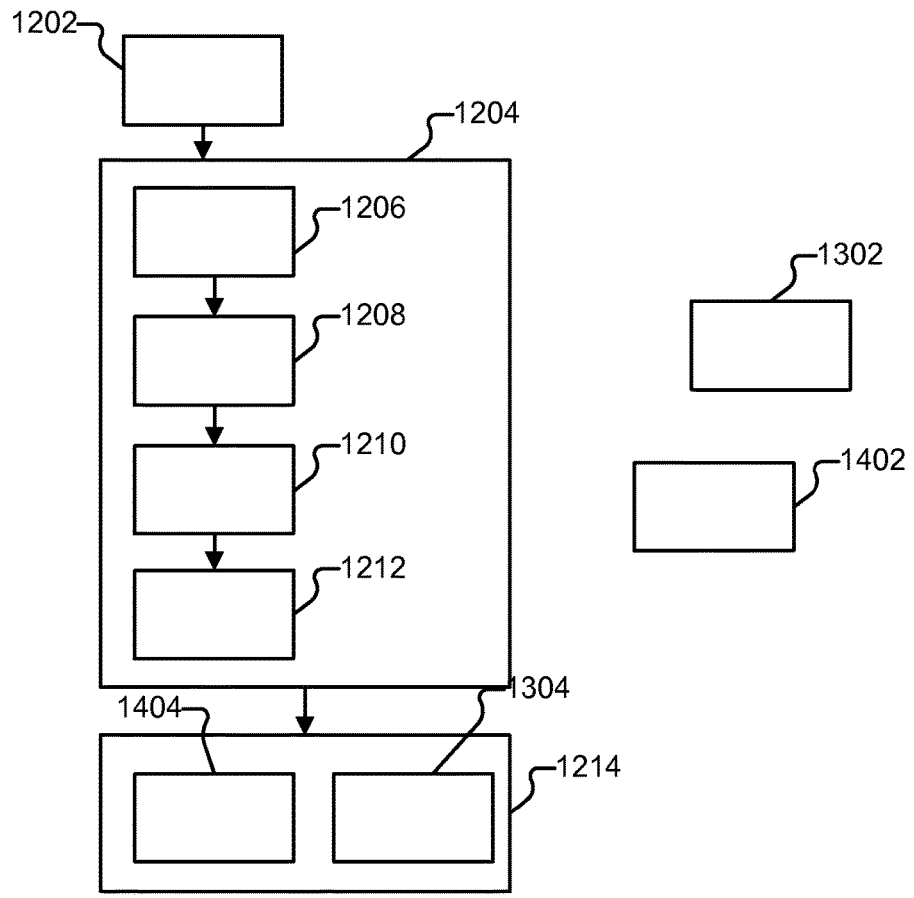
FIG. 12 shows an example workflow for processing electronic communications in accordance with various embodiments.
Figure 12:
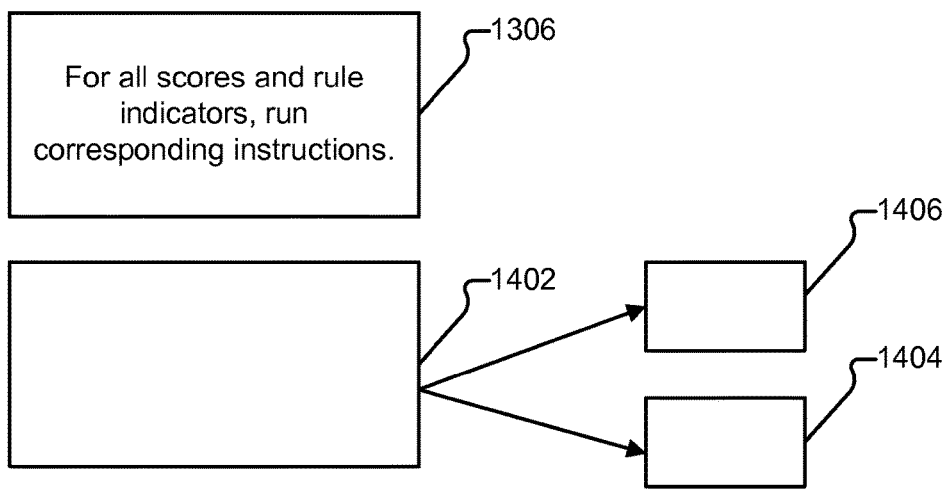

FIG. 12 shows an example workflow for processing electronic communications in accordance with various embodiments. An electronic message 1202 is received by platform 1204 (an embodiment of platform 200). The message 1202 is processed by performing a mapping action 1206 in which graphical components are converted using OCR engine 814 and graphics interpretation engine 816. Mapping action 1206 produces descriptors from images such as logos and corporate images. The message 1202 is then processed by performing a normalization action 1208 using preprocessing engine 812, followed by a replacement of equivalent terms action 1210 using content evaluator 822. It is determined in an action 1212 whether the message 1202 contains any terms contained on a term watch list 1302 using content evaluation engine 822. If any rule indicator 1304 is selected as a result of finding a term on the term watch list 1302, then it is determined whether the message 1002 matches the rule 1402 corresponding to the determined rule indicator 1304, using scoring engine 818 and content evaluation engine 822. If the message 1202 matches the rule 1402, then a corresponding score 1404 is generated, and output 1214 along with the associated rule indicator 1214. A message 1202 may contain terms matching multiple rule indicators 1304, and be correctly matched by several rules 1402. In some embodiments, a vector of scores and rule indicators is produced. Based on the rule indicators (e.g., 1214) that are produced, the corresponding instructions (e.g., 1306) are executed, using scoring engine 818 and sender evaluator 820. If the result of executing the instructions is an indication that the message matches what a legitimate sender associated with rule indicator 802 transmits, then the corresponding score 902 and associated rule indicator 1304 are removed from the output 1214. When all instructions have been executed, it is determined whether the output contains any score 1404. If it does, then processing transfers to a warning module 1402 that determines the action for the message 1202, using scoring engine 818 and action determination engine 824. Example actions include erasing the message, marking up the message by adding a warning or explanation, flagging the message, forwarding the message to a third party, such as verification service 1404, an ISP, or a repository associated with agent 1406.

Figure 13:
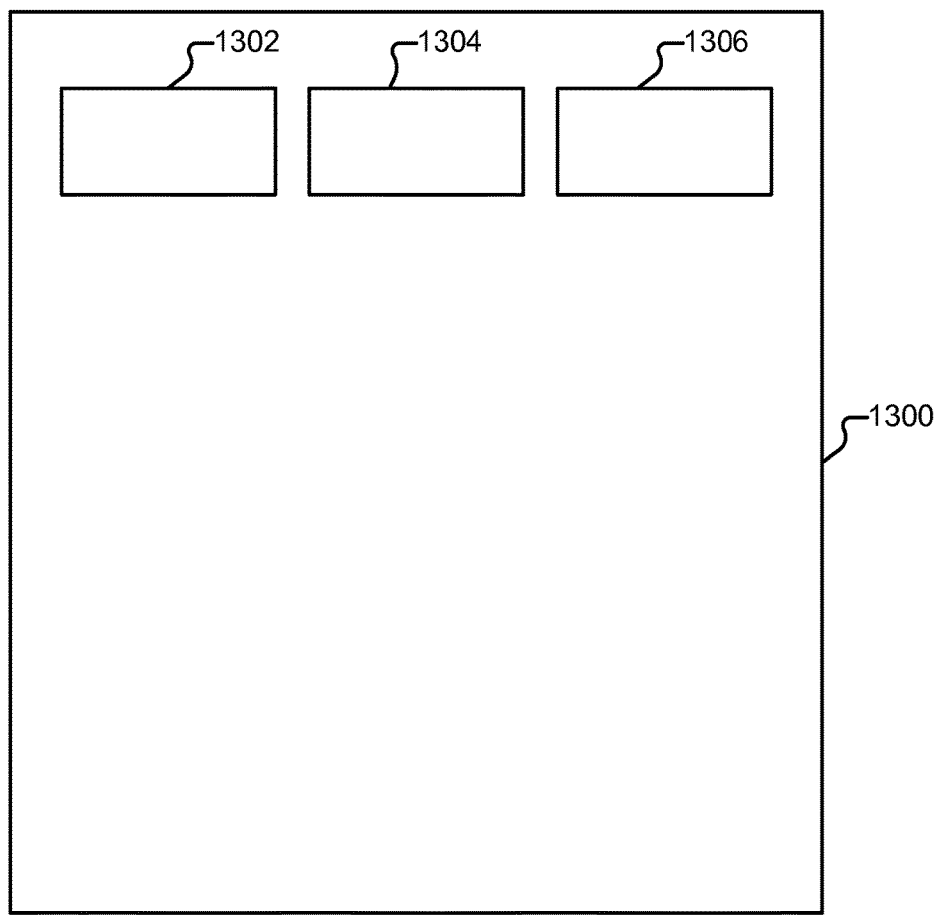
FIG. 13 shows an example term watch list.

FIG. 13 shows an example term watch list 1300, containing at least one entry of a term 1302 and at least one collection of corresponding rule indicators 1304. It also contains instructions 1306 for determining what a proper message from an institution associated with the rule indicator 802 (e.g., an authoritative entity) should contain. Some instructions 1306 select a DMARC indicator; other instructions 1306 specify from what domain, IP range, or similar the message must be sent; yet other instructions 1306 specify the contents of the message, such as whether they must only contain hyperlinks to some domains, of some formats, or whether there must be no hyperlinks. Yet other instructions 1306 require that the identified message be transmitted to a verification service 1404.

Figure 14:
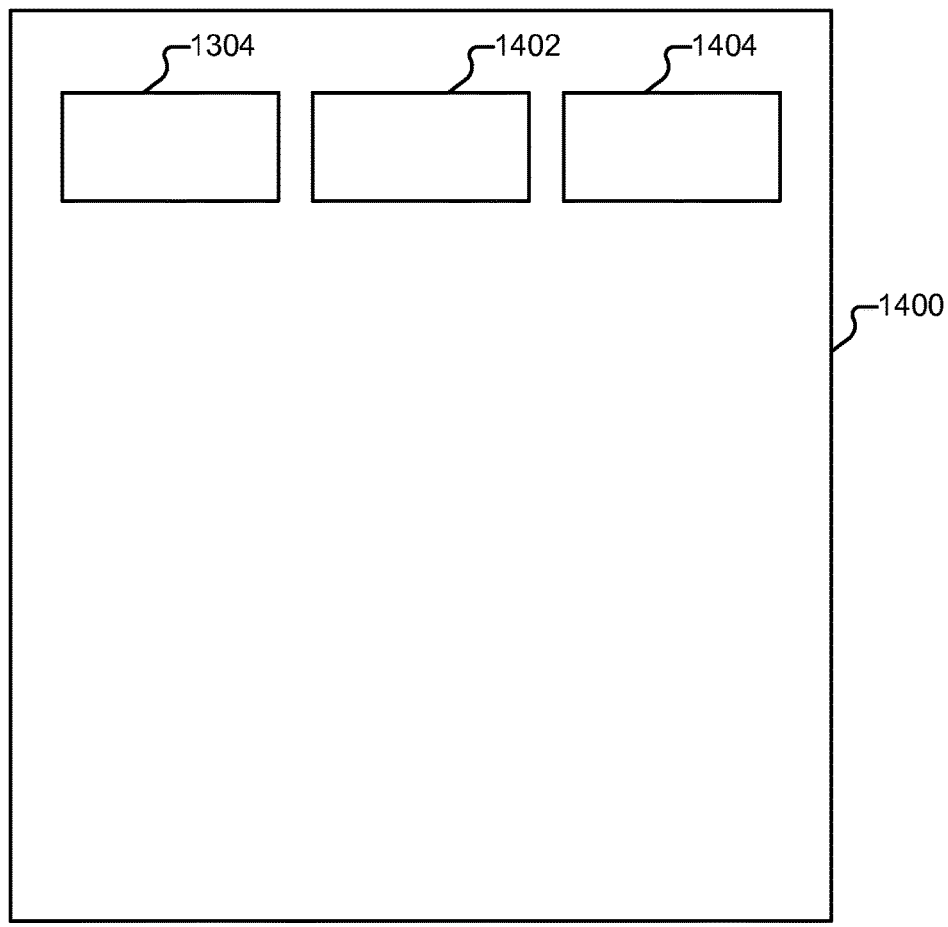
FIG. 14 shows an example rule list.

FIG. 14 shows an example rule list 1400 that includes a collection of terms 1402, a corresponding score 1404, and indexed by the rule indicator 1304.

Figure 15:
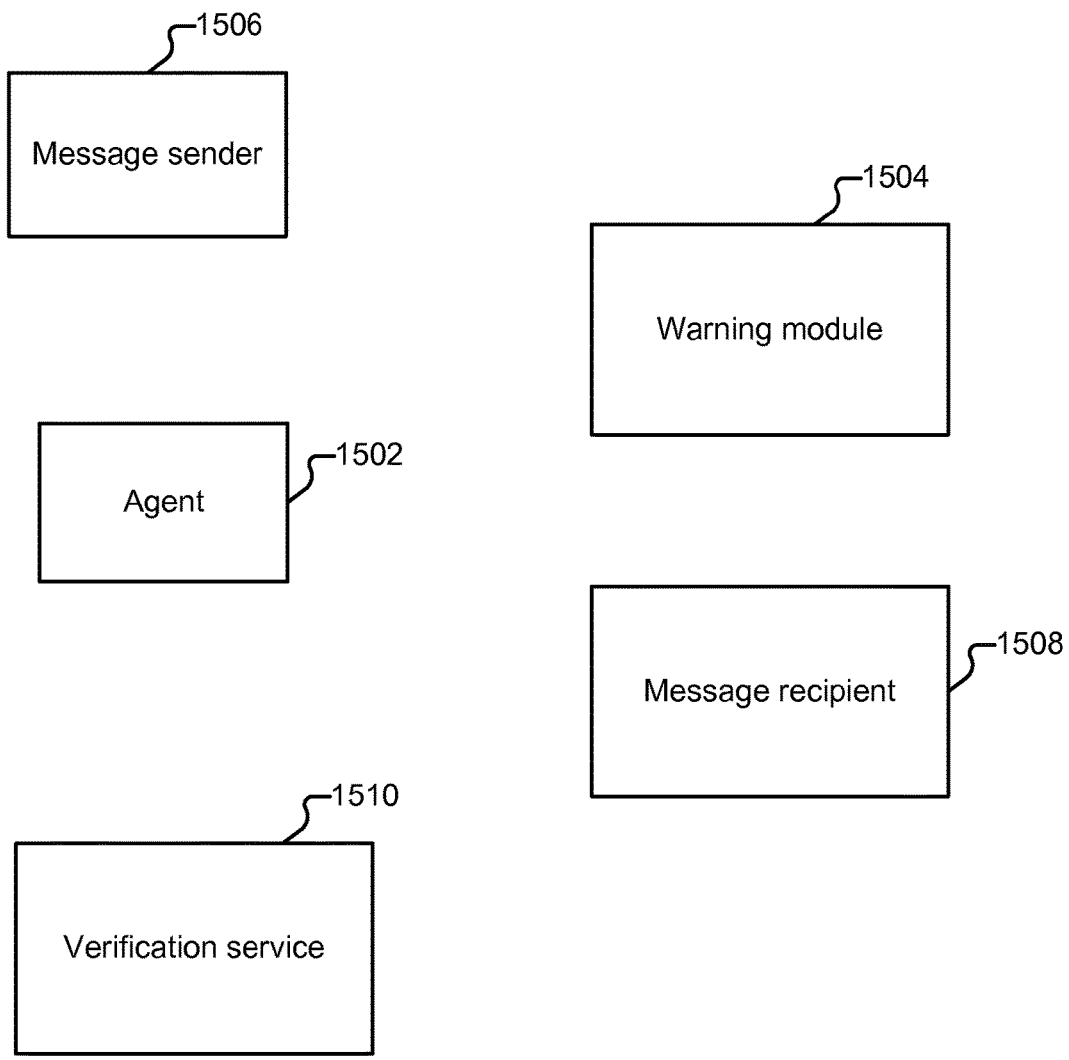
FIG. 15 shows an embodiment of an environment in which message classification is coordinated between a verification system and an agent.

FIG. 15 shows an embodiment of an environment in which message classification is coordinated between a verification system and an agent. In particular, environment 1500 includes an agent 1502, which can be associated with a mail transfer agent, a milter, or a computer that processes a message for a user. Agent 1502 can for example reside on an end-user device or on a mail service provider server. Agent 1502 facilitates a verification, such as is described in conjunction with FIG. 12. Agent 1502 forwards at least a portion of at least some messages to verification service 1510, which processes the received information and makes a security determination. The agent may not forward messages from whitelisted senders, for example, and may not forward attachments. The agent may further truncate the messages before forwarding them. In addition, the agent 1502 can report security status information and message statistics to verification service 1510. Examples of message statistics include the number of messages received by the message sender 1506 to all users of the mail system within a set duration, and the time since message sender 1506 sent its first message that was observed by the agent 1502. It can also include statistics relating to what portion of messages sent by message sender 1506 were removed by agent 1502 or associated spam filtering systems due to matching one or more spam or scam filtering rules. The message sender 1506 corresponds to an account that originated the message processed in environment 1500. Sometimes, such as when a message is determined to be spoofed, it is not known what the identity is of the message sender 1506. The message is addressed to a message recipient 1508. This corresponds to an account or mail box where a message will be delivered, unless a decision is made to filter it out and not deliver it. The environment further includes a warning module 1504 and a verification service 1510. The verification service processes the received information (e.g., as described in FIG. 12), and makes a security determination that indicates that the message should be delivered, not delivered, deleted, not deleted, placed in a special folder such as a spam folder, or not, where these actions relate to the mail box associated with message recipient 1508. These actions are taken either by agent 1502 or verification service 1510, as applicable, causing the end-user's mail folder at 1508 to be updated accordingly. The verification service also is connected to the warning module 1504 which sends at least one warning to a user associated with message recipient 1508, a system administrator associated with the user, a user who has been approved to get alerts for this user, a service provider corresponding to a security service provider, law enforcement, an impersonated brand, or an organization that is collecting warnings and sending them to entities needing them, such as those listed above. The warning may be sent by email, by SMS or conveyed in another appropriate electronic manner. The warning can describe an individual email that was filtered out, or a collection or aggregate of such. It may also contain at least portions of the messages, information corresponding to the headers, and statistics related to the message, the message sender 1506, or other information relating to or explaining scam messages.

Figure 16:
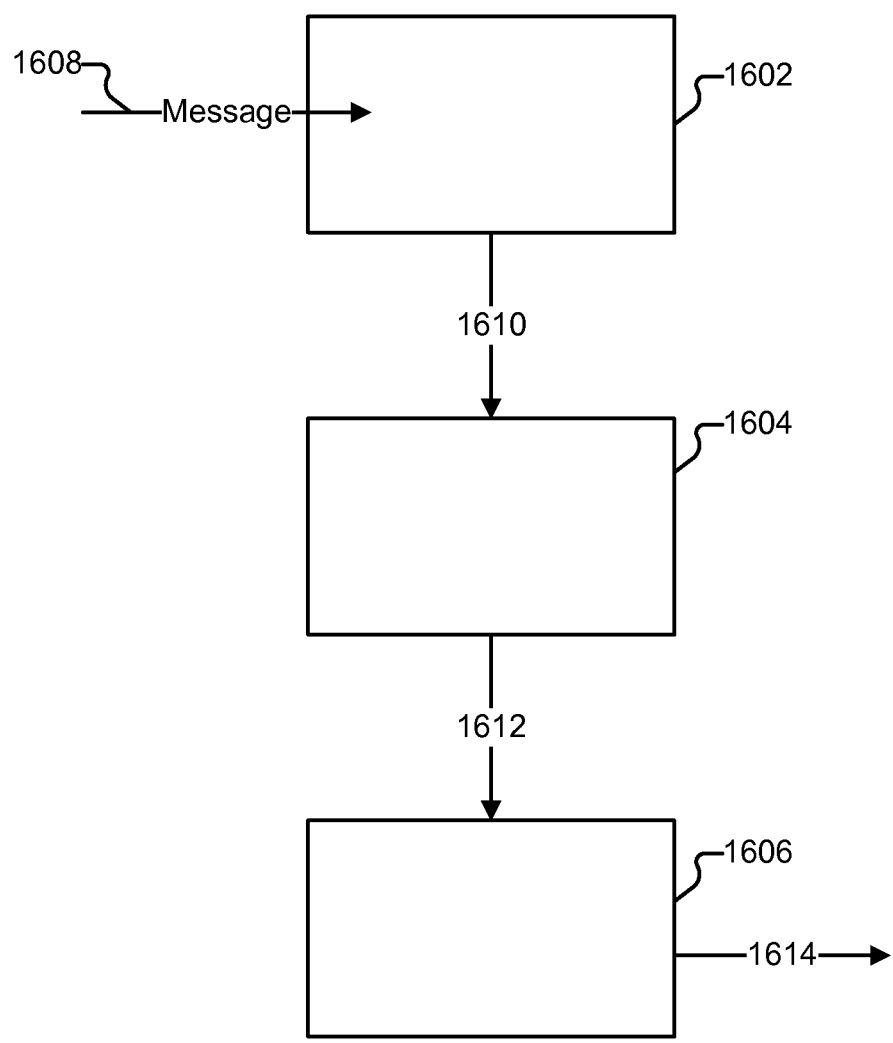
FIG. 16 shows an embodiment of a process for taking an action based on a classification of a message.

FIG. 16 shows an embodiment of a process that includes three tasks. At 1602, an input message 1608 is evaluated in terms of the content portion, generating at least one assessment 1610 of how the content is likely to be interpreted by a human recipient. The subtasks of 1602 correspond to portion 304 of process 300. The output 1610 is a list of interpretations and associated weights, where some interpretations are associated with corporate (or other authoritative entity) names, and where weights correspond to assessments of likelihoods that the associated interpretation is correct. At 1604, input message 1608, and interpretations and weights 1610 are used to determine whether the apparent sender of 1608, as indicated by the "from" field of 1608 and the interpretation(s) 1610 are likely to correspond to the actual sender of 1608. This task can be performed by analysis of the path associated with message 1608. It can also performed (in addition to or instead of) by analyzing the digital signature associated with message 1608, e.g., using DMARC, or determining the unexpected absence of a digital signature associated with message 1608, e.g., also using DMARC. The output 1612 of task 1604 is at least one determination based on the computation performed as part of task 1604. Based on output 1612 an action 1614 is taken as part of task 1606.

Figure 17:
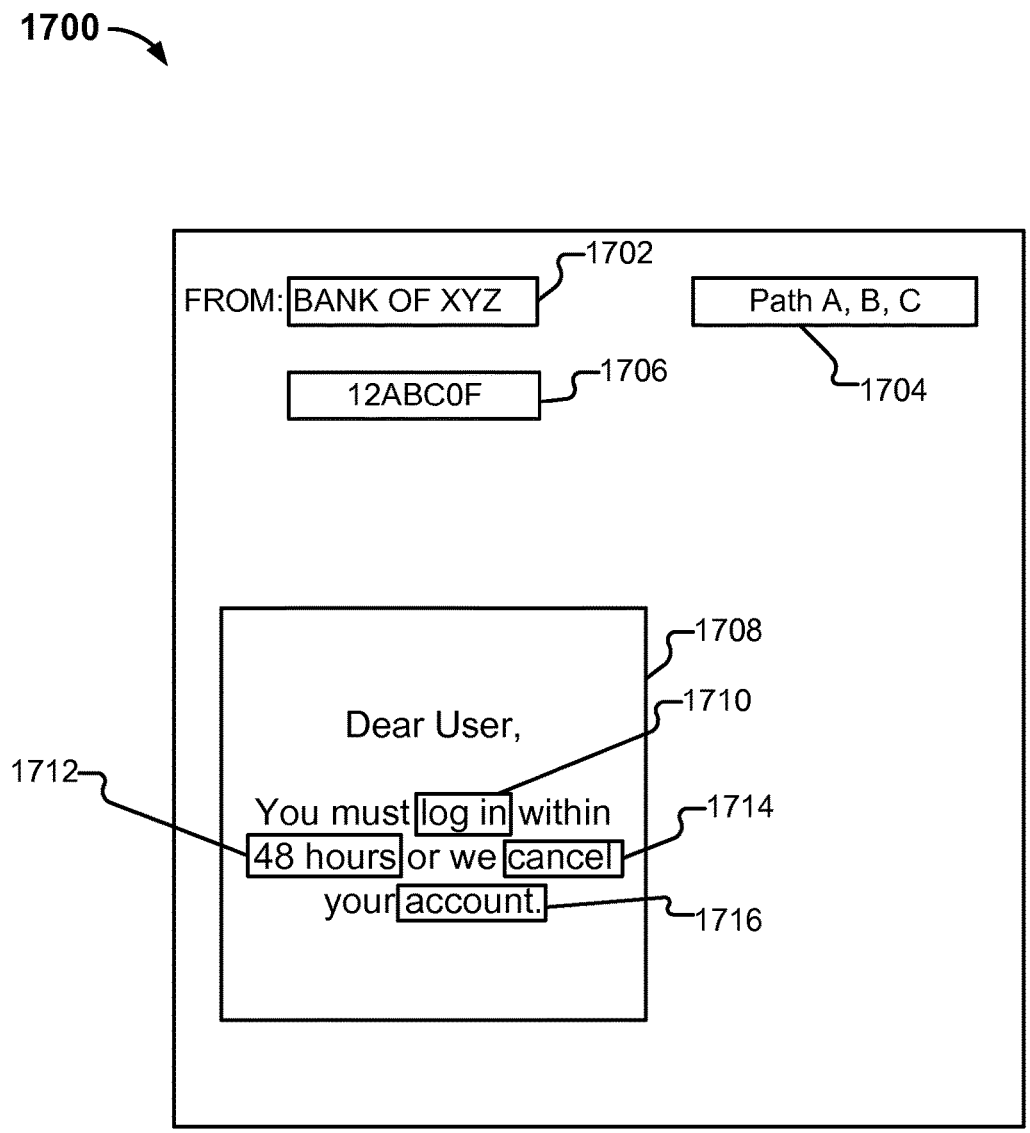
FIG. 17 shows an example message.

FIG. 17 shows an example message 1700. In the example shown in FIG. 17, message 1700 is processed using tasks 1602, 1604, and 1606. The message contains, among other things, a from field 1702, a path 1704, a digital signature 1706, and a message content portion 1708. The message content portion 1708 contains a first term 1710 that is "log in," a second term 1712 that is "48 hours," a third term 1714 that is "cancel," and a fourth term 1716 that is "account." Based on a rule (e.g., stored in database 218), if a message content portion contains all of these elements, it is considered 95% likely to be a phishing email. The apparent sender of message 1700 is XYZ Bank, as indicated by from field 1702. The output 1610 of task 1602, when provided message 1700 as input message 1608, is an interpretation stating "phishing email" and "XYZ Bank," and a likelihood that is 95%. As part of task 1604, it is determined whether message 1700, when provided as input 1608, is sent by XYZ Bank. This is done in some embodiments by determining whether signature field 1706 is present and corresponds to Bank XYZ. One reason this could be done is that occasionally, Bank XYZ may send out legitimate emails to its registered users containing terms matching terms 1710, 1712, 1714, and 1716—for example, when warning users of phishing emails, and providing an example of a common phishing email. In this scenario, the computation in task 1604 determines that the digital signature component 1706 does not correspond to the organization indicated in output 1610, i.e., XYZ Bank. The determination 1612 is that the message 1700, provided as input 1608, is a phishing email targeting potential users of XYZ Bank with a very high probability. The probability reported in this example is 97% since the path 1704 also is indicative of fraud, since one of the nodes in the path is known to have been corrupted by malware in the recent path. The action 1614 taken as part of task 1606 is to filter out message 1700 and place it in the user's spam folder, and to notify Bank XYZ later in the day of the number of emails with content portion matching terms 1710, 1712, 1714, and 1716, of which message 1700 was one.

Figure 18:
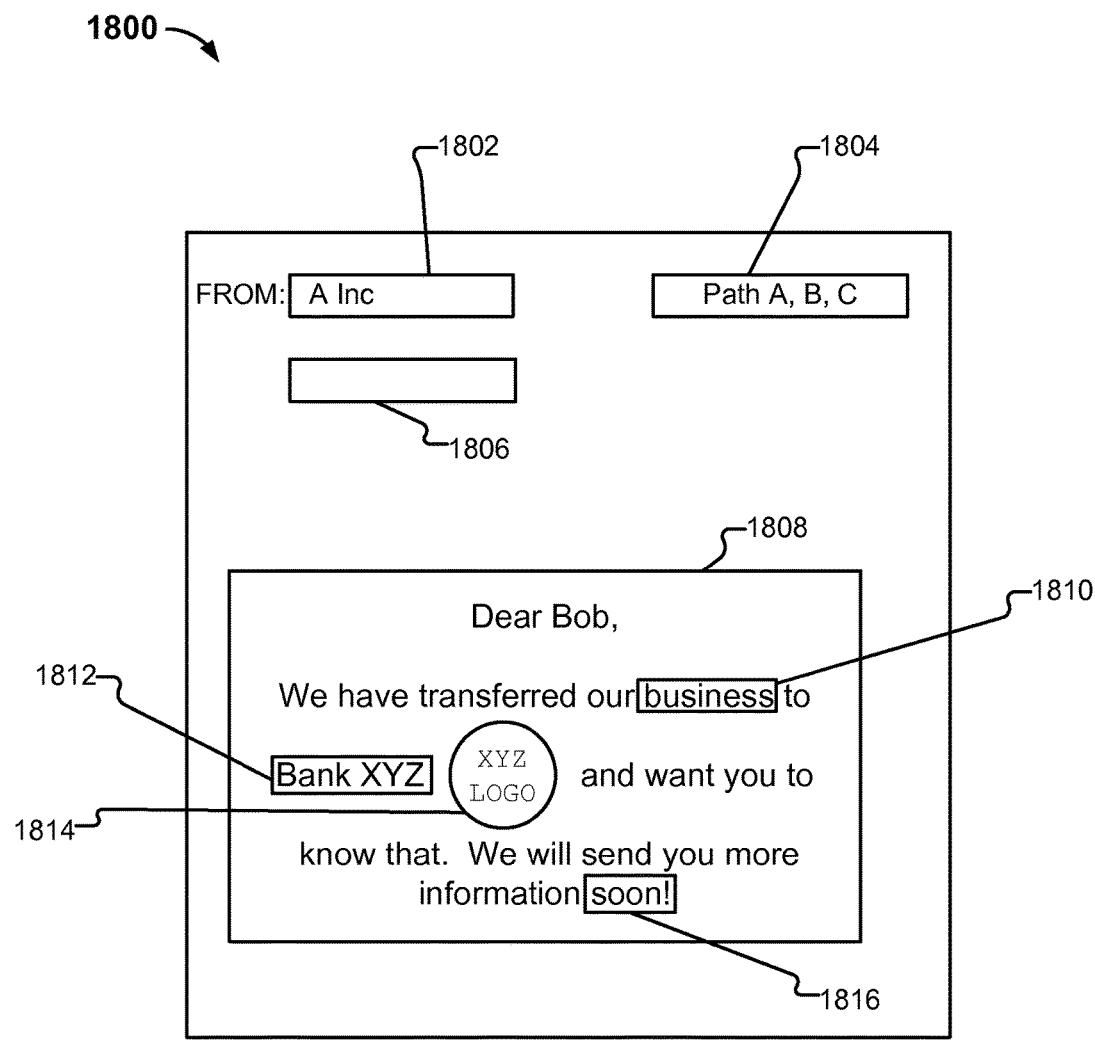
FIG. 18 shows an example message.

FIG. 18 shows another example message 1800. This is a message appearing to be sent by "A Inc," as shown in from field 1802. The path 1804 is consistent with message 1800 being sent by A Inc, and does not contain any nodes with a bad reputation. The message 1800 has an empty signature field 1806. The message content portion 1808 contains several terms that are indicative of fraud. It contains a first term 1341 that is the word "business," a second term 1812 that is "Bank XYZ," a third term 1814 that is an image corresponding to the logo of Bank XYZ, and a term 1816 that is the word "soon." Suppose, for purposes of this example, that no collection of terms match these four terms. As a result, assessment 1610 of message 1800 (when message 1800 is an example of message 1608) contains "phishing," "XYZ Bank," likelihood measure 4%. It also contains "Unauthorized use of corporate logo", "XYZ Bank", likelihood measure 50%, based on a rule that states that any mention of Bank XYZ and use of its logo is likely to be unauthorized, except if it is sent by Bank XYZ. Task 1604, when provided message 1800 as input determines that the message 1800 is not likely to be spoofed, in spite of the absence of signature 1806, since the apparent sender 1802 is not known always to digitally sign its outgoing messages. It is also determined not to be likely to be spoofed based on that the path 1804 does not contain any node that is known to be bad. The determination 1612 output from task 1604 when provided message 1800 as input 1608 is "Unauthorized use of corporate logo," "XYZ Bank," "A Inc," likelihood measure 90%. The likelihood is 90% since it is determined that the sender is not XYZ Bank. It is not 100% since XYZ Bank has authorized some entities to use its logo, but (in some embodiments) the embodiment of platform 200 performing the processing does not have access to this list. The action 1614 generated as part of task 1606 is a notification to Bank XYZ describing how many messages were processed that were sent by A Inc and which used Bank XYZ's logo, along with a copy of one such message, for officers of Bank XYZ to use as evidence if they want to file a complaint with A Inc. However, the actions (in this example) do not contain an order to filter out the message.

Figure 19:
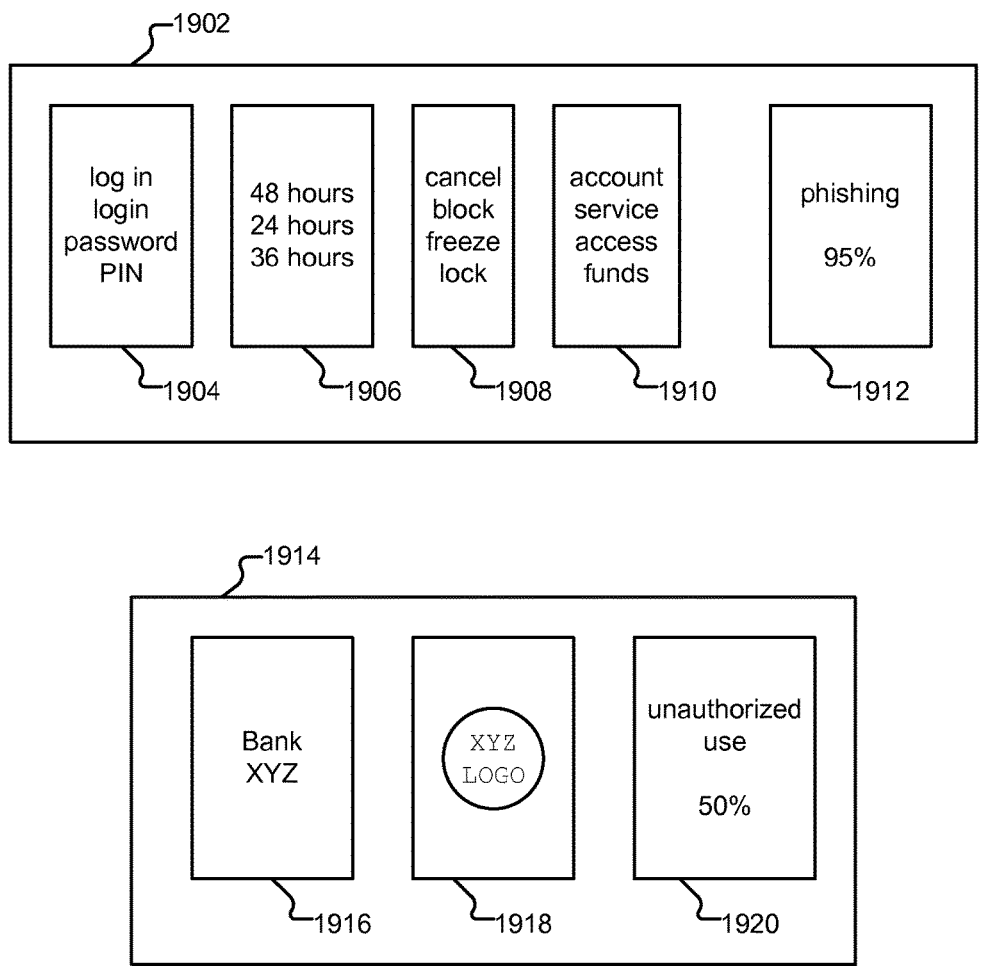
FIG. 19 shows two example rules.

FIG. 19 shows two example rules. In various embodiments, the rules are used by content evaluation engine 208, content evaluator 822, or other appropriate analysis engine (e.g., using collections of terms) as applicable. The first rule 1902 corresponds to the rule triggered in the example described in FIG. 17. A first list 1904 contains the terms "log in," "login," "password," and "PIN." In some embodiments, if a message content portion contains any one the words in list 1904, then it is considered to contain the term corresponding to list 1904. A second list 1906 contains the terms "48 hours," "24 hours," and "36 hours." If a message content portion contains any one the words in list 1906, then it is said to contain the term corresponding to list 1906. A third list 1908 contains the terms "cancel," "block," "freeze," and "lock." If a message content portion contains any one the words in list 1908, then it is said to contain the term corresponding to list 1908. A forth list 1910 contains the terms "account," "service," "access," and "funds." If a message content portion contains any one the words in list 1910, then it is said to contain the term corresponding to list 1910. If a message content portion contains at least one term included in each one of lists 1904, 1906, 1908, and 1910 then it is determined to be a phishing email with probability 95%, as indicated in item 1912, which corresponds to the interpretation of the rule being matched. The second rule 1914 contains a list 1916 with only one element, which is "Bank XYZ" and a list 1918 that is used to identify the logo of XYZ Bank. List 1918 can contain an image, a reference to an image, and/or a descriptor of an image. If a message content portion has terms containing elements from both lists 1916 and 1918, then the output that is generated is that described in element 1920, which is that the message is 50% likely to be an "unauthorized use" message.

Figure 20:
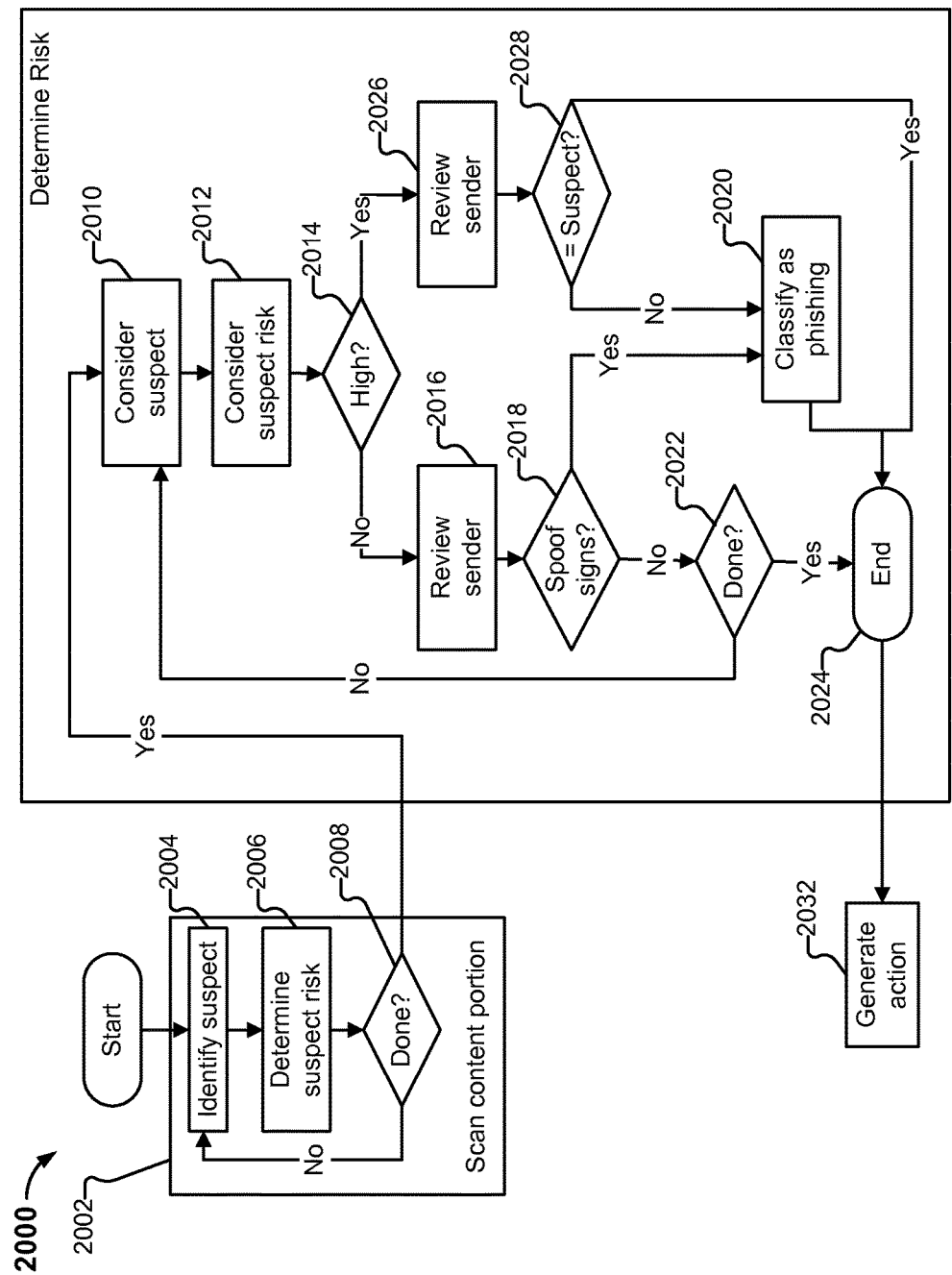
FIG. 20 depicts an example of a process for classifying a message.

FIG. 20 depicts an example of a process for classifying a message. In some embodiments, process 2000 is performed by platform 200 or portions/embodiments thereof. The process starts at 2002 with the examination of the content portion of the input message. In particular, a first suspect is identified (2004). As one example, if the input message is the message 1700, then the first suspect is XYZ Bank, obtained from field 1702. The suspect risk is also determined (2006). Returning to message 1700, the risk associated with the identified suspect is 95%, based on the example rule described in FIG. 19. It is determined whether there are any more suspects (2008). For example, the input message may contain multiple corporate names (or names of other authoritative entities), or multiple indications that suggest that a message belongs to a particular category of interest. Each one of these generates a suspect and a risk value, corresponding to output 1610. After all suspects have been identified using the available rules, a first suspect is considered at 2010. For this suspect, the associated risk is considered (2012). If the risk is higher than a threshold then the sender is reviewed in 2026, otherwise it is reviewed in 2016. These different reviews differ in scope for some implementations, but are the same in this example. In some embodiments, the threshold used in comparison 2014 is a system parameter, set by a user, set by a authoritative entity, or automatically adjusted based on previous processing. In some embodiments, at 2026, the sender is reviewed using a DMARC verification if the identified suspect supports DMARC, and by determining whether there are inconsistencies in the delivery path otherwise. It is determined at 2028 whether the sender information corresponds to the suspect. If there is a correspondence, then the message is considered valid, and the process concludes. An output is generated indicating that the message is considered valid. On the other hand, if there is no correspondence at 2028 then the input message is considered a phishing message 2020, and an output indicating this conclusion is generated (e.g., at 1528). At 2016, the sender information is reviewed using a DMARC verification if the identified suspect supports DMARC, and by determining whether there are inconsistencies in the delivery path otherwise. In an alternative example, there is no DMARC verification performed at 2016, but only a review of signs of spoofing, including determining whether there are delivery path inconsistencies, use of nodes that are associated with a low security reputation, or a technique such as greylisting, indicates that the message may be spam or spoofed. At 2018, it is determined whether there are any signs of spoofing. If there is then the input message is classified as a phishing message (2020), otherwise it determined (2022) whether all suspects have been processed. If they have not, then the next suspect is selected (2010).

Figure 21:
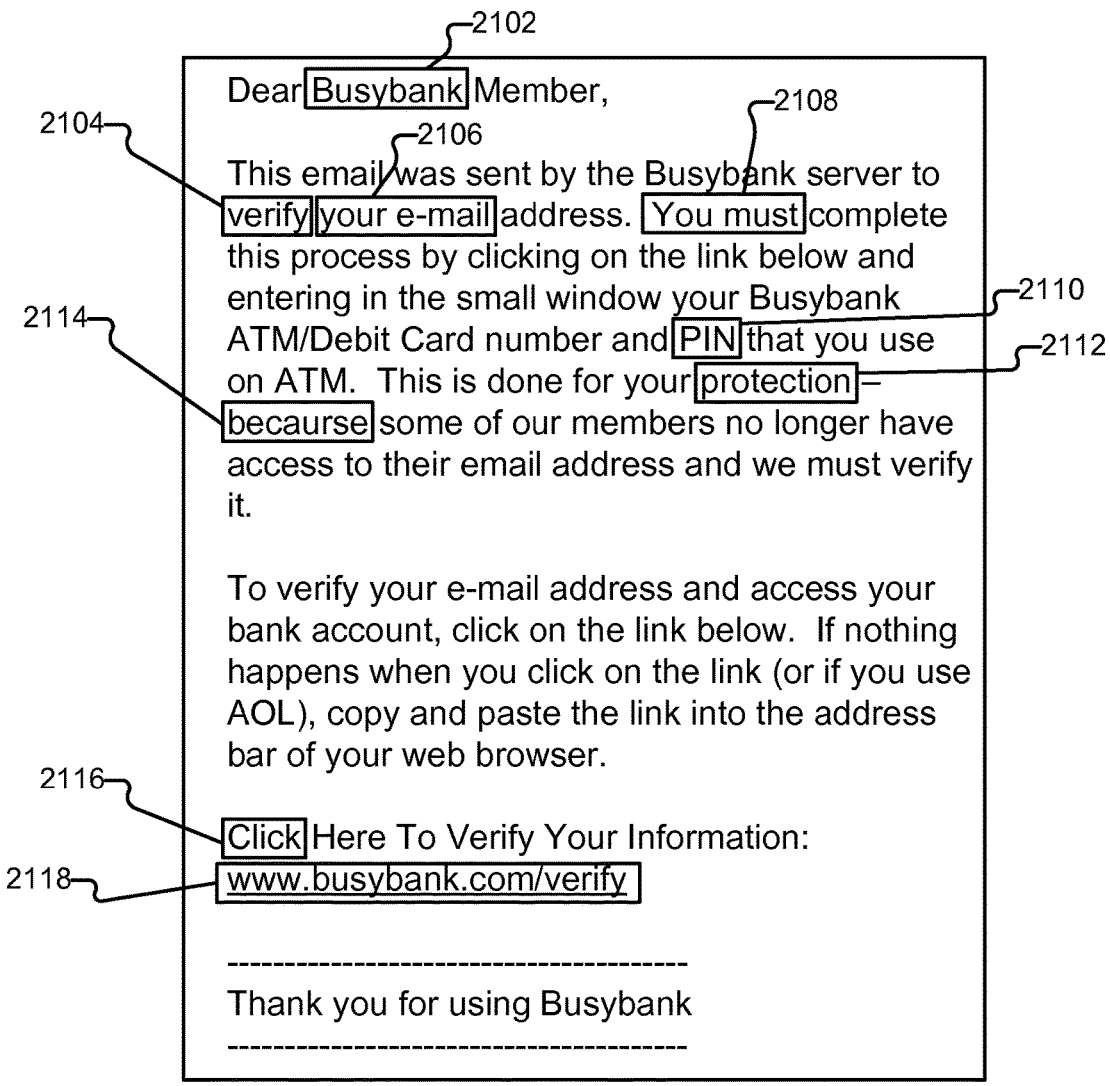
FIG. 21 shows an example content portion of an email that is a phishing email.

FIG. 21 shows an example content portion of an email that is a phishing email. It contains the following terms: Term 2102 is "Busybank," term 2104 is "verify," term 2106 is "your e-mail," term 2108 is "You must," term 2110 is "PIN," term 2112 is "protection," and term 2116 is "Click." Text 2118 has the format of a link but corresponds to a hyperlink of another domain than indicated as text in term 1608. Element 2114 is an incorrectly spelled word. This message matches a rule that can be described as ("bankname," "verify," "your email," "demand," "PIN," "security"). Here, the term "bankname" is a member of an equivalence class containing all bank names tracked by this rule, including "Busybank." Other bank names, such as ACME Bank (and permutations, as applicable, such as ACMEBANK and ACMBank can also be included). The term "verify" is a member of an equivalence class containing the terms "verify" and "confirm." The term "your email" is a member of an equivalence class with the terms "your email," "your information," "account," and "your personal." The term "PIN" is a member of an equivalence class containing "PIN," "password," and "credentials." The term "security" is a member of an equivalence class containing "security," "safety" and "protection." In a pre-processing phase of the processing of the message and the rule, all capital letters in the message are replaced with lower case, and normalizations are performed, including replacing "e-mail" with "email." Therefore, the message shown in FIG. 21 is matched by the rule ("bankname," "verify," "your email," "demand," "PIN," "security"). The message is also matched by a second rule that can be described as "contains (bankname) and (contains(mismatchdomain) or contains (spellingmistake)," which means that if the message contains a term that matches an item of the equivalence class containing "bankname" and it either contains a hyperlink and an apparent URL where the domains do not match, or contains a spelling error, as judged by a word being of a format that is not consistent with spelling rules, which corresponds to common misspellings, or which does not match any item from a database of correctly spelled words. This rule is satisfied by terms 2102 and 2118, and also by terms 2102 and 2114. Thus, both of the example rules described herein are triggered. The first one is associated with a risk measure or weight that is 100, which indicates near-certainty, and the second one is associated with a risk measure or weight that is 75, which indicates high probability. As a result of the first rule being matched, an output is produced, where this output is (("BusyBank," 100, rule1), ("Busybank," 75, rule2)). Here, the first item of each triple is an identifier describing what the affected brand is for the rule that was triggered; the second item is the weight that indicates risk, and the third item is the number of the rule, where both rule1 and rule2 belong to a group of rules that track phishing.

Figure 22:
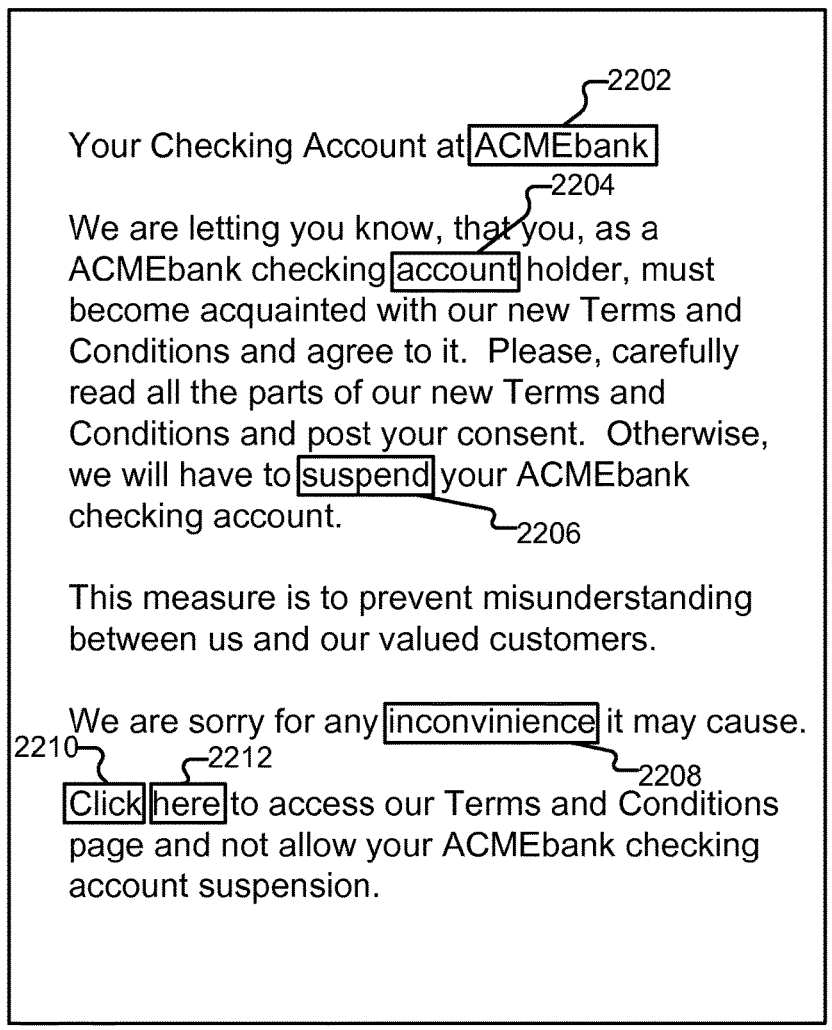
FIG. 22 shows an example content portion of an email that is a phishing email.

FIG. 22 shows a second example content portion of an email that is a phishing email. It contains term 2202 which is a member of the "bankname" equivalence class described in conjunction with FIG. 21. Message 2200 also contains a term 2204 "account" which is a member of the equivalence class containing the term "your email," also described in conjunction with FIG. 21. It further contains a term 2206 "suspend" which is a member of an equivalence class containing "suspend," "suspension," "freeze," "cancel," and "block." It contains a text segment 2208 that is an incorrectly spelled word. It contains a term 2210 that is "Click" and which is not associated with any other terms in an equivalence class. Finally, it contains a clickable text segment 2212 for which the associated domain is not on a whitelist maintained by the filter authoritative entity. The message matches the second rule described in conjunction with FIG. 21, which is the rule "contains(bankname) and (contains(mismatchdomain) or contains(spellingmistake)."

This is because it contains a bank name and a spelling error. A third rule that is described by ("account," "suspend") is also matched. This third rule corresponds to a risk-associated weight that is 64. As a result, the matching of these rules produces an output that is (("ACMEbank," 75, rule2), ("AC-MEBank," 64, rule3)). Thus, in spite of "bankname" not being part of rule 3, it is output in this example. However, if the message were not to contain any term matching a bank name, then only rule three would have triggered, and the output would have been ((empty, 64, rule3)), where empty is an indication that no bank name was identified.

Collection of Terms

Overview

"Collection of Terms"—The co-occurrence of certain terms from separate domains in a message can be indicative of a fraudulent message that corresponds to a particular scam scenario (described in more detail below). As one example, a message that contains the term "MCTN" (a term specific to Western Union) and also the term "Google Wallet" is indicative of fraud. Scammers frequently offer to send fake Google Wallet payments and request money back using Western Union. The two terms are extraordinarily unlikely to co-occur in a legitimate email discussion. However, a term such as "Google Wallet," by itself, could be prevalent in legitimate emails; a blanket blacklisting of the term is likely to result in far too many false positives (flagging legitimate messages as scam messages) to be tolerated by users being protected. The presence of a collection of terms in a message almost certainly indicates the message is fraudulent. Another example collection of terms is: "Internet Lottery," "your email has won," "congratulations," and "million dollars." The last term, "million dollars" is also considered present in a message if any so-called equivalent terms are present; such terms may consist of a list "millions dollars", "million pounds", and "several millions."

"Indicating Terms"—Terms that are statistically common in scam communications and uncommon in legitimate communications. "Internet" and "your name" are not indicating terms, as they are very prevalent in legitimate communications. "Abacha," however, is virtually absent from legitimate communications but prevalent in scam communications. Additional examples of "indicating terms" include "modalities," "no risk," "($*,000,000)" where * denotes an arbitrary value. The absence of any indicating terms in a message almost certainly indicates that the message is benign.

The presence of a collection of terms in a message almost certainly indicates the message is fraudulent, and the absence of any indicating terms in a message almost certainly indicates that the message is benign. Accordingly, in some embodiments, evaluation of a communication is performed using a collection of terms, and a classification (e.g., scam or not scam) or score is determined.

Figures 23A, 23B:
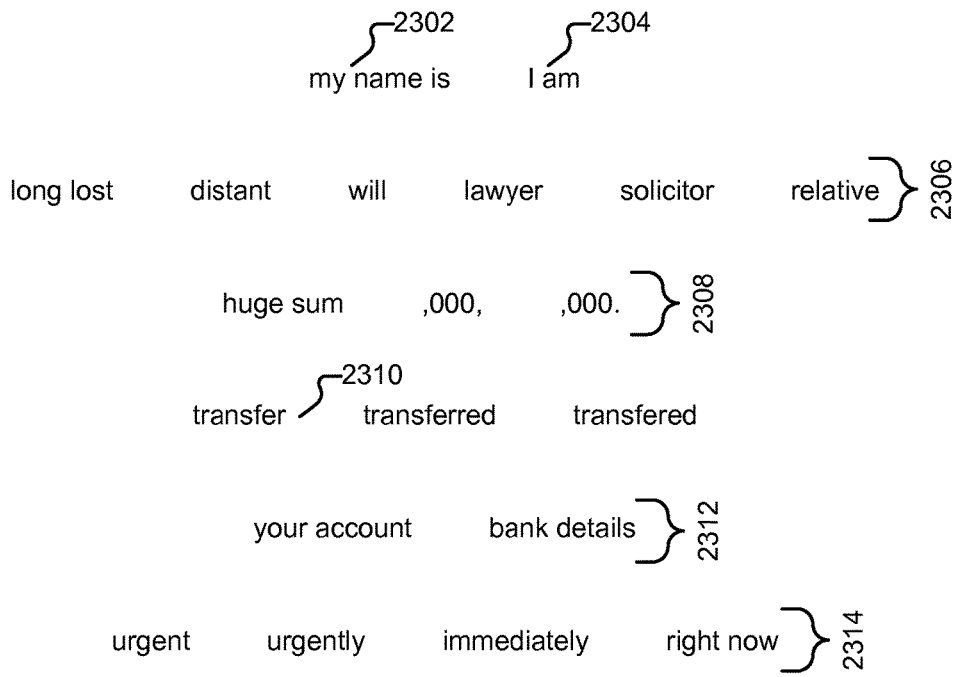
FIG. 23A depicts an example of a collection of terms.
FIG. 23B shows an example of a fraudulent message.

FIG. 23A depicts an example of a collection of terms. In particular, FIG. 23A provides an outline of a particular form of scam that is perpetrated by 419 scammers—trying to convince the victim that he or she is entitled to a large sum of money as an inheritance, and that the money will be provided as soon as the victim pays a small fee. Although the main points of the message will be common across all such scam messages conforming to the "story" the scammer is trying to trick the victim into believing, the actual wording of the scam message may vary from message to message (e.g., to thwart detection, because the message has a particular author with a distinctive writing style, or because the message was written in a first language and translated to a second). Further, subtle variations may occur due to writing problems such as misspellings.

Each row in the collection of terms depicted in FIG. 23A corresponds to one aspect of the inheritance scam story. Where multiple terms appear on a given row, the terms are collectively referred to as an equivalence class—terms that fulfill the same purpose if used in the story. For example, the particular scam represented by FIG. 23A typically begins with an introduction of either "My name is" (2302) or "I am" (2304). The scam will next invoke a long-lost relative (or their representative). Equivalence class terms for this aspect of the story are shown in region 2306. Next, the scam will describe the large amount of money (in one of three formats shown in region 2308) that can be collected by the victim in one of three formats. The scam then indicates that all that is required for the victim to receive the money (e.g., "transfer" 2310) is for the victim to provide banking details (see region 2312 for terms). The victim is encouraged to provide the banking details right away (see region 2314 for terms), e.g., to minimize the likelihood the victim will tell a friend or relative about the email and be discouraged from providing payment information.

FIG. 23B shows an example of a fraudulent message that would be detected based on analysis by a content evaluation engine of the collection of terms depicted in FIG. 23A. The terms in message 2350 that are present in the collection of terms of FIG. 23A are underlined. In some embodiments, which term in an equivalence class is used in a message (e.g., "My name is" vs. "I am") is not taken into account when evaluating the message. In other embodiments, different terms receive different scores. As one example, "huge sum" might be scored higher (i.e., indicating the message is more likely to be fraudulent) than ",000."

Figure 24:
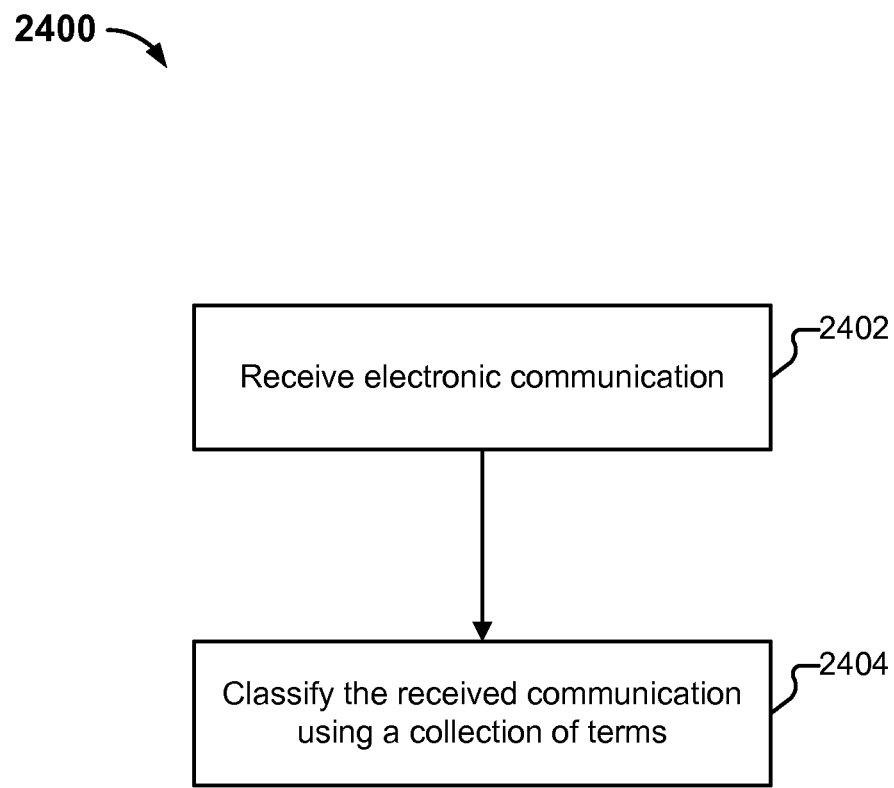
FIG. 24 illustrates an example of a process for classifying communications.

FIG. 24 illustrates an example of a process for classifying communications. The process begins at 2402 when an electronic communication is received. As one example, a communication is received at 2402 when web mail service receives a message from Charlie addressed to Alice. As another example, where at least some of the functionality is incorporated into a mail client installed on Bob's laptop, the mail client could receive a communication at 2402 when Bob's mail client contacts a corporate mail service to retrieve new mail (e.g., via IMAP).

At 2404, the communication is classified using a collection of terms. As explained above, in some embodiments the communication might be definitively classified as "good" or "bad" based on the analysis of the message against the set of collections of terms. In other embodiments, the collections of terms analysis is one consideration among multiple considerations (e.g., the additional example considerations listed above). In various embodiments, the distance between at least some terms appearing in the message is taken into account when determining whether the message should be marked as fraudulent based on the presence in the message of a collection of terms. As one example, while presence of the terms, "Nigeria" and "senator" in the same short message may typically indicate that the message is fraudulent, the message is likely not fraudulent where the terms are separated by 5,000 characters.

The classification performed at 2404 can be performed using a variety of techniques. For example, a collection of terms can be evaluated using a rule-based approach (e.g., testing for the presence of words, and/or applying a threshold number of words whose presence is needed for a match to be found); using a support vector machine, where the elements of the support vector corresponds to terms or words; and/or using general artificial intelligence methods, such as neural networks, wherein nodes correspond to terms or words, and wherein the values associated with connectors cause an output corresponding essentially to a rule-based method. In each of the aforementioned embodiments, a value associated with the severity of the collection of terms being identified can be generated and output, where multiple values are generated if multiple collections of terms have been identified.

Additional Information Regarding Collections of Terms

In some embodiments, each term (or its equivalent) must appear in the message in the order it appears in the collection. Thus, using the example of FIG. 23A, in some embodiments, if "transfer" appears before "huge sum" in a message being analyzed, the message will not be flagged as a scam, because the ordering in the collection of terms is reversed. In other embodiments, order of terms does not matter, e.g., so long as at least one term from each line of the collection shown in FIG. 23A is present in the message, the message will be classified as an inheritance scam.

In some embodiments, an analysis platform maintains scores associated with each collection of terms. One such value indicates, for each type of scam, how successful the associated term collection is at matching fraudulent emails making use of that scam. Based on factors such as the concern for various types of scams, and based on computational limitations, a selection of which term collections are to be used can be made, e.g., where processing is performed on a device with limited resources, such as a phone.

A second value associated with each collection of terms indicates the risk for false positives associated with the term collection, in the context of a given user. Example ways to determine the value is by scanning the user's inbox; by letting the user identify his or her normal activities; and/or by running the system for some amount of time; and determining the value based on classification of uncertain cases by human reviewers who review messages and classify them. This second value can also be used to select collections of terms, e.g., to avoid term collections that lead to higher false positive rates than a particular user find acceptable.

Both values can be configured based on the preferences of the protected user, and on the service level of the user (e.g., where users with higher service levels are given higher computational effort). In some embodiments, a collection of terms is matched to a portion of an email address, and a determination is made as to whether the email is from a domain associated with the terms; if it is not, then the email is flagged. As one example, an email with terms suggesting that the email is the confirmation of a financial institution payment but which is not sent from the financial institution domain is flagged as scam. In another example, a determination is made as to whether the message is from a particular sender, and if it is not, then the message is flagged as scam. In yet another example, all words are normalized before the comparison is made. This includes performing a consistent capitalization, correcting likely spelling mistakes by replacing words with the most likely candidates from a list of related words, where this list is created to emphasize words commonly used by scammers.

The following is another example of detecting a fraudulent message using a collection of terms. Suppose there are a total of two terms included in the collection (corresponding to a fraud in which victims are asked to send money by Western Union in exchange for a bogus Amazon.com payment). In this example, no equivalence terms are included—just a total of two distinct terms—("Western Union", "Amazon payment"). If a document contains both of these terms, whether separated by other words or not, then the document is considered to match. Suppose the message is, "Here is an Amazon payment for $100. Please send me $50 with Western Union." Such a message would match the collection of terms, as would "Please send your Western Union payment after you receive the Amazon payment." However, a message of, "Here is an Amazon payment for the Western Digital hard drive I want to purchase. Please send it to my home in Union, N.J.," would not match since "Western" and "Union" are separated. A message of, "Here is an AMAZON payment for $100, please send the money with western union" would match, where normalization is applied to remove capitalization. In an embodiment where spelling errors are corrected/normalized, "Here is an Amaz0n payment. Please send money using western unjon," would match the collection of terms, since "Amaz0n" once corrected would become "Amazon," and "unjon" would be corrected to "union" before the verification is made.

In some embodiments, a global list of equivalent terms is maintained (e.g., usable across multiple collections of terms), such as "USD," "us$," and "euro." While a Euro is not the same as a USD, the usage of either concept by a scammer is functionally the same. In some embodiments, as a message is evaluated (e.g., by a content evaluation engine), it is first normalized by capitalization and spelling normalization, then the system replaces any terms found in the document matching a term in the list of equivalent terms with a representative term, such as the first term in the equivalence list. After that, the document is verified to determine if it matches any of the rules, such as the ("Amazon", "Western Union") rule. In some embodiments, any images included in/attached to/linked to in the message, are interpreted using OCR techniques, and any associated texts combined with ASCII text material before the verification is made.

In some embodiments, each of the non-equivalent terms in a collection of terms (e.g., "long lost" and "huge sum") are associated with one or more pointers, and ordered alphabetically. The number of pointers associated with each term is the same as the number of rules for which that term is used. Each rule is represented as a vector of Boolean values, where the vector has the same length as the associated rule contains words. All the binary values are set to false before a message is parsed. The message is parsed by reviewing word by word, starting with the first word. If the word being reviewed does not fully or partially match any of the alphabetically ordered terms, then the next word is reviewed instead. If a word matches a term fully, then all Boolean values that are pointed to by the pointers associated with the term that the word matches are set to true. If one or more words matches a term partially by being the first words in the term, then the next word of the message is being added to the comparison and it is determined whether the previously partially matching words now partially of fully match any of the terms that was previously partially matched. If a full match is achieved, then the Boolean values associated with the pointers of this term are set to true. If a partial match is achieved, then the next word is added, and the process repeated. If a sequence of words being matched first partially matches and then does not match, then the system again will consider one word, starting with the second word of the previous sequence. After the entire document has been parsed in this manner, the system determines whether any of the vectors of Boolean values is all true, and if this is so, then the algorithm outputs that there is a match; otherwise it outputs that there is no match. A match means that the message is dangerous. This comparison can also be made each time a Boolean value is set to true by determining if the vector in which this Boolean value is an element is all true, and it so, output "match" and conclude the processing of the message. In a variant implementation, the system determines how many of the vectors are set to all-true; and outputs a counter corresponding to this number. Alternatively, each vector is associated with a weight, and the system determines the sum of all the weights for which the associated vectors are all-true. The message is then identified as having dangerous content, and the sum determines the extent of the danger. In one embodiment, the Boolean vectors are not set to all-false between the scan of two related messages that are part of a thread and sent to the same person. This provides detection capabilities in situations where information is dispersed over multiple related messages, which causes the thread of messages to be considered dangerous.

—Obtaining Collections of Terms—

Collections of terms, an example of which is depicted in FIG. 23A, can be included in a platform in a variety of ways. As one example, a human administrator (or contractor linguist, or other appropriate entity) can manually create a given collection (and optionally assign it a title, as applicable, such as "inheritance scam"), which can be stored for use by the platform. As another example, messages that are flagged (e.g., by human reviewers) as being fraudulent, but are not otherwise flagged by the platform can be examined—either automatically, or in cooperation with humans, such as an administrator or reviewers, and collections of terms formulated to identify such fraudulent messages in the future.

Figure 25:
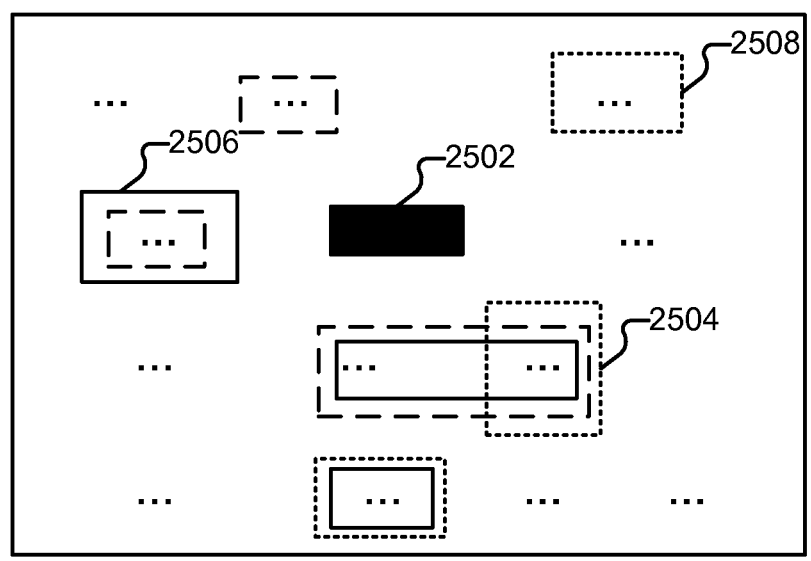
FIG. 25 illustrates an example of an interface configured to receive feedback usable to create collections of terms.

FIG. 25 illustrates an example of an interface configured to receive feedback usable to create collections of terms. In the example shown, an administrator is reviewing feedback provided by three reviewers about why a particular message is believed to be fraudulent. Specifically, reviewers are asked to indicate which terms they believed were most important in reaching their determination of bad, by highlighting the terms.

The terms selected by each of the three reviewers are indicated to the administrator as three types of boxes—sold boxes indicate a selection by a first reviewer; dashed boxes indicate a selection by a second reviewer; and dotted boxes indicate a selection by a third reviewer. In the example shown in FIG. 25, the administrator is not authorized to see the full message, so certain terms (e.g., term 2502) are redacted, even for the administrator. All three reviewers agree that term 2504 is probative of why the message is fraudulent. Other terms have votes from only two (e.g., 2506) or just one (e.g., 2508) of the reviewers. In various embodiments, the administrator can review the selections made by the reviewers, and act, e.g., as a fourth reviewer, to pick which terms should be included in a collection of terms usable to detect the scam represented by the message. The administrator can also set thresholds (e.g., minimum of two votes needed, reviewer reputation score needed, etc.) for automatically selecting terms, and then retain the ability to approve or veto the automatic inclusion of the collection of terms in the collection. In some embodiments, the flagging of terms in the message is presented to users as a CAPTCHA.

In some embodiments, automated techniques are used to generate collections of terms (and/or indicating terms). For example, suppose the classification of a given message is "bad." An example platform can be configured to identify terms that distinguish it from messages of the good message set, using the TF-IDF (term frequency inverse document frequency) principle. A limited number of such terms are selected, where the number is either a system parameter or a function of the TF-IDF value, and where the terms are selected in order of decreasing TF-IDF values; while selecting at least a threshold number of word terms; at least a threshold number of bigrams; and at least a threshold number of trigrams. These selected terms are stored, and referred to as temporary terms. The platform then computes a modified TF-IDF value for the normalized message and messages of the good message set, using constellations of the temporary terms, where a constellation is an unordered list of elements selected from the temporary terms, for different such selections. This identifies collections of elements from the set of temporary terms that are particularly rare in good messages. A threshold number of the resulting terms are kept, selected in order of decreasing modified TF-IDF value. The threshold is either a parameter number or a function of the modified TF-IDF number. The result are rules that identifies the input message as bad, and the inverse of the modified TF-IDF number is an estimate of the false positive rate for classification of messages using the associated rule. These rules are then ordered in terms of decreasing values of a counter measuring how many messages in the collection of known bad messages that each such rule matches. These counters are estimates of how general the associated rule is. One or more rules are selected from the rules, where the selection criteria are low false positive rates and large degree of generality. An example selection picks the rule that maximizes a measure equaling the generality measure divided by the false positive rate, i.e., the associated counter times the associated modified TF-IDF value. The selected rules are added to the database of rules. This approach is used to compute new rules to identify bad messages. In one version of the algorithm, the entire set of known good messages is used in place of the at least one message that is part of the input.

As another example, collections of terms can be generated using artificial intelligence techniques configured to identify common words in scam messages, but which are not as common in desirable messages; identify collections of such words that are frequent in scam messages but which are highly infrequent in desirable messages; and identify collections of such terms that are common in scam messages but which are essentially absent in desirable messages.

—Temporal Considerations—

The disclosed techniques can take into consideration temporal relationships between messages when making an assessment. For example, in some embodiments a platform can be configured to scan sequences of messages forming a conversation. It may be that one of the messages in the sequence does not have sufficient evidence of being abusive, whereas a sequence of such messages collectively provides sufficient evidence to be filtered out as being bad. This will cause any future emails of the same type or in the same sequence to also be considered bad.

Figure 26:
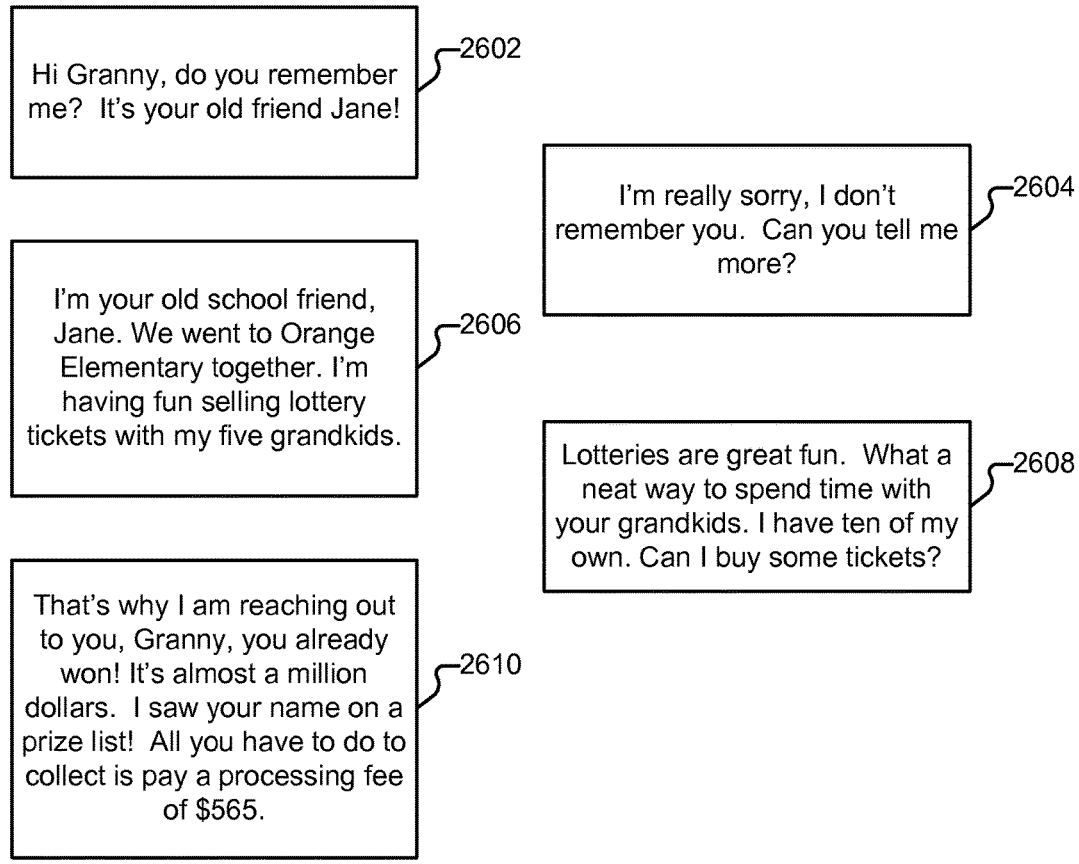
FIG. 26 illustrates an example of a sequence of messages.

FIG. 26 illustrates an example of such a sequence of messages. In the first message (2602), a user called "Grandma" receives a seemingly benign email from someone claiming to be a long lost friend. It does not mention lotteries. Grandma responds (2604) that she cannot remember her friend, then gets a second email (2606) saying that they were in the same elementary school, and now her friend sells lottery tickets and has five grandchildren. Grandma responds (2608) that this sounds like a fun thing to do, and that she has ten grandchildren. Her "long lost friend" then says (2610) that the reason she contacted Grandma was that she saw her name as one of the lottery winners, and remembered her name from her childhood, then decided to find her to tell her about her winnings How could she not pick up the money, it is nearly a million dollars, and all she has to do is to pay the processing fee of $565.

Each email in the exchange, by itself, might be seen as innocuous, with the potential exception message 2610. By the time message 2610 is received, however, most existing spam filters would have whitelisted the scammer, given the number of emails sent and received from her by Grandma without incident. In various embodiments, platform 200 examines the entire sequence of emails (or a moving window of several emails), concatenating the text together and performing analysis on the concatenated text. The concatenated text would readily match a "Lottery Scam" collection of words, and the messages would be classified as "bad," accordingly.

A second example of temporal processing is as follows. Suppose a user is receiving a sequence of emails over a few weeks time, where the sequence of emails establishes an online friendship or relationship, and then asks for money for some purpose. The initial sequence of emails is purely intended to establish trust, after which the typical request for money arrives. A person who has seen such a scam perpetrated might recognize its making from the early emails. A machine learning component (e.g., of content evaluation engine 208) can identify a sequence of messages as bad when identifying the request for money, and then identify indications in the trust-establishing emails that are indicative—whether by themselves or as a subsequence—of the request to come. This way, the machine learning component will constitute an early-warning system in which indications of fraud are picked up before there are signs that by themselves correspond to an effort to extract money.

In portions of the above, the description has used as an example how to identify and classify 419 scam messages. The techniques described herein can be used to identify and classify other types of messages based on their content portion; such as phishing messages, messages containing undesirable content; messages containing deceptive content; messages containing requests for information, purchase requests, information requests, and more; and messages that either should or should not be given high priority by another system, such as either a manual or automated second system that is used to process messages.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A classification system for detecting attempted deception in an electronic communication, comprising:
    a client device used to access the electronic communication addressed to a user of the client device;
    at least one of a profile and content database; and
    at least one server in communication with the client device and the at least one of the profile and content database, the at least one server comprising:
        an interface configured to receive the electronic communication; and
        a set of one or more processors configured to:
            parse a display name associated with the electronic communication;
            determine, by at least one classifier component, that the electronic communication appears to have been transmitted on behalf of an authoritative entity by:
                computing a similarity distance between the display name and at least a name of the authoritative entity, wherein the name of the authoritative entity is retrieved from the at least one of the profile and the content database, wherein the similarity distance is computed by comparison of items by at least one of:
                    basing the comparison on at least one of a match between the display name of the electronic communication and the display name of the authoritative entity, and
                    a match between headers associated with the electronic communication and headers associated with the authoritative entity,
                    wherein the matches are determined by at least one of:
                        determining that the compared items are the same, determining that the compared items have a Hamming distance below a threshold value, determining that the compared items have an edit distance below a threshold value, determining that a support vector machine indicates a similarity based on previously trained examples, determining a similarity score based on how many characters were replaced by characters of sufficient similarity and performing at least one normalization followed by a comparison;
            determine, by the at least one classifier component, that the electronic communication was not transmitted with authorization from the authoritative entity;
            based at least in part on determining that the electronic communication appears to have been transmitted on behalf of the authoritative entity and determining that the electronic communication was not transmitted with authorization from the authoritative entity, perform a security determination including classifying the electronic communication, wherein the classifying includes two or more security classifications including good and bad; and
            based at least in part on the security determination resulting in a bad classification, perform an action comprising at least one of erasing the electronic communication, marking up the electronic communication at least in part by adding a warning or an explanation, flagging the electronic communication, forwarding the electronic communication to a third party, placing the electronic communications in the spam folder, and forwarding the electronic communication to a repository; and
        a memory coupled to the processor and configured to provide the processor with instructions.

2. The system of claim 1 wherein determining that the electronic communication appears to have been transmitted on behalf of the authoritative entity includes evaluating text present in a body portion of the electronic communication.

3. The system of claim 2 wherein determining that the electronic communication appears to have been transmitted on behalf of the authoritative entity includes performing one or more pre-processing operations on the text, including a normalization.

4. The system of claim 2 wherein evaluating the text includes evaluating the text using a collection of terms.

5. The system of claim 2 wherein evaluating the text includes performing an equivalence analysis.

6. The system of claim 2 wherein determining that the electronic communication appears to have been transmitted on behalf of the authoritative entity includes evaluating one or more images.

7. The system of claim 6 wherein evaluating the one or more images includes performing optical character recognition on the one or more images.

8. The system of claim 6 wherein evaluating the one or more images includes performing edge detection analysis.

9. The system of claim 6 wherein evaluating the one or more images includes performing color pattern analysis.

10. The system of claim 6 wherein evaluating the one or more images includes evaluating one or more images linked to the electronic communication.

11. The system of claim 2 wherein determining whether the electronic communication appears to have been transmitted on behalf of the authoritative entity includes evaluating an email address included in the electronic communication.

12. The system of claim 1 wherein determining that the electronic communication was not transmitted with authorization from the authoritative entity includes determining whether the electronic communication was authenticated by the authoritative entity.

13. The system of claim 1 wherein determining that the electronic communication was not transmitted with authorization from the authoritative entity includes evaluating a delivery path associated with the electronic communication.

14. A method for detecting attempted deception in an electronic communication, comprising:
- receiving, by at least one server, an electronic communication addressed to a user of a client device;
- parsing, by the at least one server, a display name associated with the electronic communication;
- determining, by at least one classifier component executing on one or more processors, that the electronic communication appears to have been transmitted on behalf of an authoritative entity by:
  - computing a similarity distance between the display name and at least a name of the authoritative entity, wherein the name of the authoritative entity is retrieved from the at least one of the profile and a content database, wherein the similarity distance is computed by comparison of items by at least one of:
    - basing the comparison on at least one of a match between the display name associated with the electronic communication and the display name of the authoritative entity, and
    - a match between headers associated with the electronic communication and headers associated with the authoritative entity,
  - wherein the matches are determined by at least one of:
    - determining that the compared items are the same, determining that the compared items have a Hamming distance below a threshold value, determining that the compared items have an edit distance below a threshold value, determining that a support vector machine indicates a similarity based on previously trained examples, determining a similarity score based on how many characters were replaced by characters of sufficient similarity and performing at least one normalization followed by a comparison;
- determine, by the at least one classifier component, that the electronic communication was not transmitted with authorization from the authoritative entity;
- based at least in part on determining that the electronic communication appears to have been transmitted on behalf of the authoritative entity and determining that the electronic communication was not transmitted with authorization from the authoritative entity, perform a security determination, by the at least one server, including classifying the electronic communication, wherein the classifying includes two or more security classifications including good and bad; and
- based at least in part on the security determination resulting in a bad classification, perform an action by the at least one server comprising at least one of erasing the electronic communication, marking up the electronic communication at least in part by adding a warning or an explanation, flagging the electronic communication, forwarding the electronic communication to a third party, placing the electronic communications in the spam folder, and forwarding the electronic communication to a repository.

15. A computer program product embodied in a non-transitory computer readable storage medium and comprising computer instructions executed by at least one server for detecting attempted deception in an electronic communication, the computer instructions for:
- receiving an electronic communication addressed to a user of a client device;
- parsing a display name associated with the electronic communication;
- determining, by at least one classifier component executing on one or more processors, that the electronic communication appears to have been transmitted on behalf of an authoritative entity by:
- computing a similarity distance between the display name and at least a name of the authoritative entity, wherein the name of the authoritative entity is retrieved from at least one of a profile and a content database, and wherein the similarity distance is computed by comparison of items by at least one of:
- basing the comparison on at least one of a match between the display name of the electronic communication and the display name of the authoritative entity, and
- a match between headers associated with the electronic communication and headers associated with the authoritative entity,
  - wherein the matches are determined by at least one of:
    - determining that the compared items are the same, determining that the compared items have a Hamming distance below a threshold value, determining that the compared items have an edit distance below a threshold value, determining that a support vector machine indicates a similarity based on previously trained examples, determining a similarity score based on how many characters were replaced by characters of sufficient similarity and performing at least one normalization followed by a comparison;
- determining, by the at least one classifier component, that the electronic communication was not transmitted with authorization from the authoritative entity;

based at least in part on determining that the electronic communication appears to have been transmitted on behalf of the authoritative entity and determining that the electronic communication was not transmitted with authorization from the authoritative entity, perform a security determination including classifying the electronic communication, wherein the classifying includes two or more security classifications including good and bad; and based at least in part on the security determination resulting in a bad classification, perform an action comprising at least one of erasing the electronic communication, marking up the electronic communication at least in part by adding a warning or an explanation, flagging the electronic communication, forwarding the electronic communication to a third party, placing the electronic communications in the spam folder, and forwarding the electronic communication to a repository.

* * * * *

UNITED STATES PATENT AND TRADEMARK OFFICE
CERTIFICATE OF CORRECTION

PATENT NO. : 10,277,628 B1
APPLICATION NO. : 14/487989
DATED : April 30, 2019
INVENTOR(S) : Bjorn Markus Jakobsson Page 1 of 1

It is certified that error appears in the above-identified patent and that said Letters Patent is hereby corrected as shown below:

In the Specification

Column 35: Line 48, replace "the at least one of the" with --at least one of a--.

Column 36: Line 4, replace "determine" with --determining--; Line 12, replace "perform" with --performing--; Line 19, replace "perform" with --performing--.

Column 37: Line 6, replace "perform" with --performing--; Line 11, replace "perform" with --performing--.

Signed and Sealed this
Eighth Day of October, 2019

Andrei Iancu
*Director of the United States Patent and Trademark Office*